United States Patent
Yao et al.

(10) Patent No.: US 12,150,065 B2
(45) Date of Patent: Nov. 19, 2024

(54) POWER CONTROL METHOD, UE, BASE STATION, PARAMETER CONFIGURATION METHOD AND CONTROL METHOD

(71) Applicant: ZTE CORPORATION, Guangdong (CN)

(72) Inventors: Ke Yao, Shenzhen (CN); Bo Gao, Shenzhen (CN); Zhaohua Lu, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/946,151

(22) Filed: Sep. 16, 2022

(65) Prior Publication Data

US 2023/0014784 A1    Jan. 19, 2023

Related U.S. Application Data

(63) Continuation of application No. 16/875,693, filed on May 15, 2020, now Pat. No. 11,457,414, which is a
(Continued)

(30) Foreign Application Priority Data

Nov. 17, 2017 (CN) .......................... 201711148323.5

(51) Int. Cl.
*H04W 52/08* (2009.01)
*H04L 25/02* (2006.01)
(Continued)

(52) U.S. Cl.
CPC ....... *H04W 52/146* (2013.01); *H04L 25/0226* (2013.01); *H04W 52/08* (2013.01);
(Continued)

(58) Field of Classification Search
CPC ..... H04W 72/04; H04W 16/28; H04W 52/10; H04W 52/04; H04W 52/38; H04W 4/08;
(Continued)

(56) References Cited

U.S. PATENT DOCUMENTS

2014/0241301 A1    8/2014   Nakashima et al.
2016/0135147 A1    5/2016   Ouchi et al.
(Continued)

FOREIGN PATENT DOCUMENTS

CN      102427608 A    4/2012
CN      103327594 A    9/2013
(Continued)

OTHER PUBLICATIONS

Adhoc Chair (Samsung): RAN1 session notes for agenda item 7.6 (UL power control) 3GPP TSG RAN WG1 Meeting 90bis; R1-171xxxx; Oct. 13, 2017; Prague, CZ (4 pages).
(Continued)

*Primary Examiner* — Tu X Nguyen
(74) *Attorney, Agent, or Firm* — Foley & Lardner LLP

(57) ABSTRACT

Disclosed are a power control method, a UE, a base station, a parameter configuration method and a control method. The power control method comprises: receiving at least one piece of configuration information, where the configuration information comprises at least one sounding reference signal (SRS) resource set, the reference signal resource set comprises at least one SRS resource, the SRS resource set is identified by an SRS resource set index, and the SRS resource is identified by a first SRS resource index; receiving at least one power control parameter set; receiving an association one between the SRS resource set and a power control parameter, or an association two between SRS and the power control parameter; and determining a power control parameter of an SRS corresponding to the SRS
(Continued)

Receive at least one piece of configuration information, where the configuration information includes at least one sounding reference signal (SRS) resource set, the sounding reference signal resource set includes at least one SRS resource, the SRS resource set is identified by an SRS resource set index, and the SRS resource is identified by a first SRS resource index; receive at least one power control parameter set; and receive an association one between the SRS resource set and a power control parameter, or an association two between the SRS and a power control parameter — 101

Determine a power control parameter of an SRS corresponding to the SRS resource according to the received configuration information, the received power control parameter set and one of the association one or association two — 102 resource according to the received configuration information, power control parameter set and one of the association one or the association two.

12 Claims, 4 Drawing Sheets

Related U.S. Application Data continuation of application No. PCT/CN2018/116277, filed on Nov. 19, 2018.

(51) Int. Cl.
*H04W 52/10* (2009.01)
*H04W 52/14* (2009.01)
*H04W 52/24* (2009.01)
*H04W 52/32* (2009.01)

(52) U.S. Cl.
CPC ......... *H04W 52/10* (2013.01); *H04W 52/242* (2013.01); *H04W 52/325* (2013.01)

(58) Field of Classification Search
CPC . H04W 52/08; H04W 72/232; H04W 72/044; H04W 72/02
See application file for complete search history.

(56) References Cited

U.S. PATENT DOCUMENTS

| | | | |
|---|---|---|---|
| 2016/0242125 A1 | 8/2016 | Lee et al. | |
| 2019/0103949 A1* | 4/2019 | Harrison | H04B 7/0456 |
| 2019/0356431 A1* | 11/2019 | Manolakos | H04B 7/0639 |
| 2020/0252241 A1* | 8/2020 | Park | H04L 25/0224 |
| 2020/0383060 A1 | 12/2020 | Park et al. | |

FOREIGN PATENT DOCUMENTS

| | | |
|---|---|---|
| CN | 103379603 A | 10/2013 |
| CN | 104349443 A | 2/2015 |
| CN | 104518845 A | 4/2015 |
| CN | 105009640 A | 10/2015 |
| CN | 106470096 A | 3/2017 |
| CN | 109803362 B | 4/2022 |
| WO | WO-2016/005003 | 1/2016 |
| WO | WO-2017/050017 A1 | 3/2017 |
| WO | WO-2017/192889 A1 | 11/2017 |

OTHER PUBLICATIONS

Examination Report on IN Appl. No. 202027023862, dated Jun. 3, 2022 (7 pages).
Extended European Search Report for EP Appl. No. 18879517.3, dated Jun. 28, 2021 (16 pages).
Extended European Search Report on EP 18879517.3 dated Sep. 29, 2021 (13 pages).
Final Office Action on U.S. Appl. No. 16/875,693 Dtd Mar. 7, 2022.
First Office Action for CN Appl. No. 201711148323.5, dated Apr. 6, 2021 (11 pages).
First Office Action for JP Appl. No. 2020-526884, dated Jul. 26, 2022 (with English translation, 7 pages).
Huawei et al.: "sPUCCH power control" 3GPP TSG RAN WG1 Meeting #90bis; R1-1717146; Oct. 13, 2017; Prague, Czech Republic (4 pages).
International Search Report for PCT Appl. No. PCT/CN2018/116277 mailed Feb. 20, 2019.
Notice of Allowance on U.S. Appl. No. 16/875,693 Dtd May 19, 2022.
Samsung: "On UL Power Control" 3GPP TSG RAN WG1 Meeting 90bis; R1-1717692; Oct. 13, 2017; Prague, Czech (6 pages).
Second Office Action for CN Appl. No. 201711148323.5, dated Oct. 9, 2021 (3 pages).
U.S. Office Action on U.S. Appl. No. 16/875,693 Dtd Nov. 26, 2021.
U.S. Office Action on U.S. Appl. No. 16/875,693 Dtd Sep. 3, 2021.
ZTE: "Offline summary for AI 7.6 NR UL power control" 3GPP TSG RAN WG1 Meeting #90bis; R1-1718883; Oct. 13, 2017; Prague, Czechia (21 pages).
First Office Action for CN Appl. No. 202210481858.9, dated Jun. 2, 2024 (with English translation, 12 pages).
LG Electronics, "Discussion on uplink power control for NR", 3GPP TSG RAN WG1 Meeting #88bis, R1-1704895, Apr. 7, 2017, Spokane, USA (5 pages).
First Office Action for CN Appl. No. 202210481860.6, dated Mar. 28, 2024 (with English translation, 15 pages).
Second Office Action for CN Appl. No. 202210481860.6, dated Aug. 12, 2024 (with English translation, 11 pages).

* cited by examiner

POWER CONTROL METHOD, UE, BASE STATION, PARAMETER CONFIGURATION METHOD AND CONTROL METHOD

CROSS-REFERENCES TO RELATED APPLICATIONS

This application is a continuation of U.S. application Ser. No. 16/875,693, filed May 15, 2020, which claims priority to PCT Application Serial No. PCT/CN2018/116277, filed on Nov. 19, 2018, which is based on and claims priority to Chinese patent application No. 201711148323.5 filed on Nov. 17, 2017, the disclosures of which are incorporated herein by reference in their entireties.

TECHNICAL FIELD

The present application relates to, but is not limited to, the technical field of wireless communications and, in particular, relates to a power control method, a user equipment (UE), a base station, a parameter configuration method and a control method.

BACKGROUND

The 5G New Radio (NR), as an ongoing research project of the Third Generation Partnership Project (3GPP), determines new radio air interface standards based on orthogonal frequency division multiplexing (OFDM), and will be the basis of the next generation mobile network. As a fifth generation mobile communication system, the NR technology needs to support more different types of application scenarios than ever, and also needs to support conventional frequency bands, high-frequency bands and the beam mode at the same time, which brings great challenges to the power control design.

The power control in the long term evolution (LTE) technology is related to many factors, such as a pathloss, target receiving power, maximum transmitting power, a closed-loop power adjustment amount, a transmission bandwidth, a transmission rate and so on. In LTE, a sounding reference signal (SRS) is transmitted by a user equipment to a base station and is used for sounding an uplink channel, and transmitting power control of the SRS is closely related to a power control process of a physical uplink shared channel (PUSCH). The SRS in an NR multi-beam scenario not only needs to inherit characteristics of the SRS in LTE, but also needs to meet new requirements, such as performing an uplink beam scan. A process of the uplink beam scan may have different phases, which respectively support trainings of transmitting and/or receiving different numbers of beams. Results of the beam scan are used for determining a subsequent PUSCH, a physical uplink control channel (PUCCH), and a transmitting beam of the SRS. At the same time, due to time-varying characteristics of a radio channel, in a data transmission process, the UE also needs to transmit an SRS for channel sounding or beam scanning. Therefore, in the multi-beam scenario, the NR needs to support SRSs with various different requirements, and has different requirements for the power control mechanism. How to realize the power control satisfying communication signal requirements and implementing a flexible configuration is one of the urgent problems to be solved.

SUMMARY

The present application provides a power control method, a UE, a base station, a parameter configuration method and a control method.

An embodiment of the present application provides a power control method. The power control method includes steps described below.

At least one piece of configuration information is received, where the configuration information includes at least one sounding reference signal (SRS) resource set, the sounding reference signal resource set includes at least one sounding reference signal resource, the SRS resource set is identified by an SRS resource set index, and the SRS resource is identified by a first SRS resource index.

At least one power control parameter set is received.

An association one between the SRS resource set and a power control parameter or an association two between an SRS and a power control parameter is received.

A power control parameter (i.e., a transmitting power parameter) of an SRS corresponding to the SRS resource is determined according to the received configuration information, the received power control parameter set and one of the association one or the association two.

An embodiment of the present application further provides a power control method. The power control method includes a step described below.

A power control parameter and/or a transmitting beam resource of a physical uplink shared channel is used as a power control parameter and/or a transmitting beam resource of a physical uplink control channel, when the physical uplink shared channel and the physical uplink control channel satisfy at least one of following conditions described below.

The physical uplink shared channel and the physical uplink control channel are in a same scheduling unit.

The physical uplink shared channel and the physical uplink control channel are frequency-divided.

The physical uplink shared channel and the physical uplink control channel have a same transmitting beam.

A reference signal associated with the physical uplink shared channel and a reference signal associated with the physical uplink control channel satisfy a channel characteristic assumption.

An embodiment of the present application further provides a parameter configuration method.

The parameter configuration method includes a step described below.

A base station configures a configuration parameter X for a user equipment, where the configuration parameter X is used for antenna management control and/or beam management control.

An embodiment of the present application further provides a control method. The control method includes a step described below.

In a same carrier, a power adjustment is performed on a channel and/or signal to be transmitted symbol-by-symbol to satisfy following requirements.

Maximum power of the carrier is less than or equal to a preset maximum power limit threshold of the single-carrier, and channels and/or signals of a same type among multiple symbols within a same slot maintain same non-zero power or a same non-zero power spectral density.

An embodiment of the present application further provides a control method. The control method includes a step described below.

In multiple carriers, a power adjustment is performed on a channel and/or signal to be transmitted symbol-by-symbol to satisfy following requirements.

Maximum power of the multiple carriers is less than or equal to a preset maximum power limit threshold of the multiple carriers, and channels and/or signals of a same type among multiple symbols within a same slot in a same carrier maintain a same non-zero power or a same non-zero power spectral density.

An embodiment of the present application further provides a user equipment. The user equipment includes a processor, a memory and a communication bus.

The communication bus is configured to implement a connection communication between the processor and the memory.

The processor is configured to execute an uplink power control program stored in the memory to implement steps described below.

At least one piece of configuration information is received, where the configuration information includes at least one sounding reference signal (SRS) resource set, the sounding reference signal resource set includes at least one sounding reference signal resource, the SRS resource set is identified by an SRS resource set index, and the SRS resource is identified by a first SRS resource index.

At least one power control parameter set is received.

An association one between the SRS resource set and a power control parameter, or an association two between an SRS and a power control parameter is received.

A power control parameter of an SRS corresponding to the SRS resource is determined according to the received configuration information, the received power control parameter set and one of the association one or the association two.

An embodiment of the present application further provides a base station. The base station includes a processor, a memory and a communication bus.

The communication bus is configured to implement a connection communication between the processor and the memory.

The processor is configured to execute an uplink power control program stored in the memory to implement steps described below.

At least one piece of configuration information is configured, where the configuration information includes at least one sounding reference signal (SRS) resource set, the sounding reference signal resource set includes at least one sounding reference signal resource, the SRS resource set is identified by an SRS resource set index, and the SRS resource is identified by a first SRS resource index.

At least one power control parameter set is configured.

An association one between the SRS resource set and a power control parameter or an association two between an SRS and a power control parameter is configured.

A scheduling indication of the SRS is transmitted to a user equipment according to the configuration information, the power control parameter set and one of the association one or association two and according to the configuration.

An embodiment of the present application further provides a power control method. The power control method includes steps described below.

At least one piece of configuration information is configured, where the configuration information includes at least one sounding reference signal (SRS) resource set, the sounding reference signal resource set includes at least one sounding reference signal resource, the SRS resource set is identified by an SRS resource set index, and the SRS resource is identified by a first SRS resource index.

At least one power control parameter set is configured.

An association one between the SRS resource set and a power control parameter is configured, or an association two between an SRS and a power control parameter is received.

An embodiment of the present application further provides a power control method. The power control method includes a step described below.

When at least part of parameters in open-loop power control parameter set(s) of uplink transmission are configured or reconfigured, a local closed-loop power adjustment amount corresponding to a closed-loop power control process identification associated with an index of the configured or reconfigured open-loop power control parameter set is reset.

An embodiment of the present application further provides a computer storage medium for storing computer-executable codes, where, after being executed, the computer-executable codes are capable of implementing the method of any one of embodiments described above.

The power control method, the UE, the base station, the parameter configuration method and the parameter control method provided in the present application determine a power control parameter of an SRS according to configuration information of a base station, and uniform architecture is utilized to determine transmitting power for different types of SRSs in the multi-beam scenario, thereby flexibly supporting different requirements of various SRSs for the power control with a reasonable overhead.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

Figure 1:
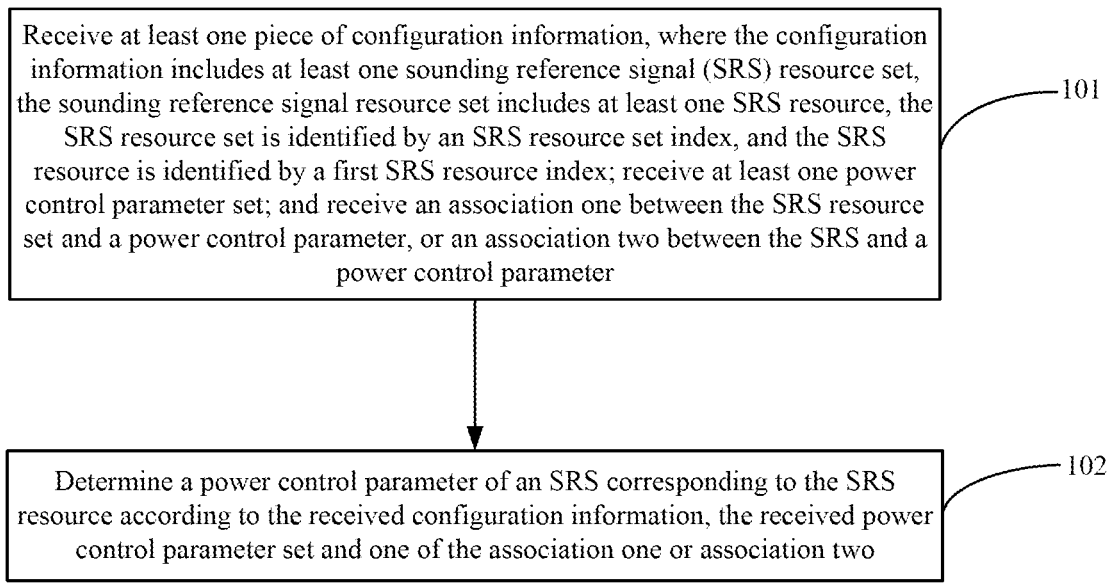
FIG. 1 is a flowchart of a power control method according to an embodiment of the present application.

In order to make objects, technical solutions and advantages of the present application be clearer, a detailed description of embodiments of the present application is provided below in conjunction with the drawings. It is to be noted that if not in collision, the embodiments and features therein in the present application may be combined with each other.

In a radio communication system, transmitting power control is required for a transmission to reduce power consumptions of a transmission device and reduce interferences to other transmissions caused by an unnecessary high-power transmission. The transmitting power is affected by factors such as the size of a communication range, maximum transmitting power and receiving sensitivity of transceiving devices on both communication parties, a modulation and coding scheme (MCS) of data, a rate of the modulation and coding scheme, a working frequency band, and a bandwidth occupied by transmissions. Generally, relatively low transmitting power needs to be used as much as possible under the condition that quality requirements of a receiving signal at a receiver end are satisfied.

For example, communication node 1 transmits a reference signal, and communication node 2 measures a pathloss (PL) from node 1 to node 2 according to the reference signal. The PL is measured by transmitting power of the reference signal of node 1 and the power of the reference signal received by node 2. It is assumed that the PL of a transmission channel from node 2 to node 1 is the same as the PL of a channel from node 1 to node 2, the transmitting power is set such that receiving power at the receiver end of the transmission may satisfy the receiving requirements. Since the PL is the result of a unilateral measurement, this factor belongs to an open-loop part in the transmitting power. The node 2 receives the transmission, then performs analyzing, and provides node 1 with information about a power adjustment according to the received quality. This process belongs to closed-loop power control.

In LTE, a link from a base station to a terminal is a downlink, and a link from the terminal to the base station is an uplink. Power of the downlink is determined by the base station according to a channel measurement result of each scheduled UE and a scheduling algorithm. Power control of the uplink is in a manner where an open loop is combined with a closed loop, in which a power control factor determined by measurements of the UE belongs to the open-loop part, and a power control factor measured by the base station and fed back to the UE belongs to the closed-loop part. In addition, certain quantities related to the transmission, such as a transmit rate, an MCS level, a transmitting bandwidth and so on, also affect the power.

The following is a calculation formula for the transmitting power of the PUSCH of LTE. This formula is used as an example to illustrate each parameter that affects the power. The PUCCH also has similar parameters and mechanisms.

$$P_{PUSCH,c}(i) = \min\left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

In the above formula, a subscripted c refers to a cell, and each component carrier (CC) supporting a carrier aggregation (CA) function corresponds to one cell. It can be seen from the above formula that each parameter in the power calculation formula is configured or calculated for each of different cells. All descriptions herein are described for one CC, so that no specific reference to a cell is made. It should be noted that all parameters herein may be extended to multiple CCs, and power-related configurations and calculated parameters need to be separately configured for each CC.

An open-loop part of power of the PUSCH (PPUSCH) in an uplink transmission is determined by target receiving power PO_PUSCH, a pathloss (PL) amount and a pathloss factor $\alpha$. The target receiving power is classified into cell-level parameters and UE-level parameters, both of which are determined by the base station and configured for the UE. The closed-loop part is that the base station determines a closed-loop power control adjustment amount according to a difference between a measurement result and a target, and notifies the UE in a manner of a transmit power control command (TPC Command, i.e., $S_{PUSCH}$ for the PUSCH and $\delta_{PUCCH}$ for the PUCCH in downlink control information (DCI)). The UE maintains a local closed-loop power control adjustment amount f(i), the closed-loop power control adjustment amount is updated according to the transmit power control command, and the purpose of closed-loop power control is achieved by using the above formula. In the above formula, i denotes a subframe number, $\Delta_{TF}$ denotes an MCS-related power offset, $P_{CMAX}$ denotes a maximum power limit of the UE, and $M_{PUSCH}$ is a number of resource blocks (RBs) occupied by the PUSCH.

The cell-level target receiving power P0_nominal of LTE is set for differentiating the PUSCH (semi-static, dynamic, MSG3) and the PUCCH, which correspond to different block error rate (BLER) requirements respectively. The UE-level target receiving power P0_UE_specific is also set for differentiating the above items, and its function is to compensate a systematic deviation, such as a PL estimation error and an error of an absolute output power setting.

f(i) is updated according to the transmit power control command in two manners: a cumulative manner and an absolute value manner. Where, the absolute value manner refers to directly updating the local closed-loop power control adjustment amount f(i) of the UE according to the transmit power control command transmitted by the base station, while the cumulative manner refers to determining the local closed-loop power control adjustment amount f(i) of the UE according to the transmit power control command transmitted by the base station and a historical value of the local closed-loop power control adjustment amount of the UE jointly.

It should be noted that f(i) denotes the local closed-loop power control adjustment amount of the UE, and in LTE, the local closed-loop power control adjustment amount of the UE of the PUCCH is denoted by g(i). f(i) herein may also be applied to the PUCCH, and its function in a power control process is similar to that when it is applied to the PUSCH.

The 5G technology introduces a beam transmission manner, and both the base station and the UE support multiple beams. When operating at a beam mode, a power calculation needs to take characteristics of beams into account. The present application provides a power control method in a multi-beam mode. Each parameter mentioned in the present application is applied to different channels, such as a PUSCH, a long PUSCH, a short PUSCH, a PUCCH, a long PUCCH, a short PUCCH, and signals, such as an SRS. When parameters with a same type are applied to each of the above channels or signals, the parameters may be configured independently or in combination. Configuration in combination refers to that different channels or signals may share a same value, and it is determined in a predefined manner or configured by the base station which channels or signals may share the same value.

Various beam-related concepts have been used in the description of the present application. For ease of understanding, following explanations are made.

The transmitting mode includes at least one of: a transmitting beam, a transmitting port, a transmitting resource, a reference-signal sequence, a transmitting precoding matrix (in an analog manner, in a digital manner or in a hybrid manner), a synchronization signal resource indication or a reference signal resource indication. The reference signal resource indication includes an uplink reference signal resource indication and/or a downlink reference signal resource indication. The transmitting mode determined by the synchronization signal resource indication and the downlink reference signal resource indication refers to an uplink transmitting mode, such as a transmitting beam or a transmitting port, obtained by a certain receiving mode (e.g., a mode with the best receiving performance, the minimum PL, or the maximum reference signal received power (RSRP)) corresponding to a synchronization signal resource or a downlink reference signal resource for receiving an indication using a reciprocity between the uplink and downlink or an association of uplink and downlink reference signals. The transmitting mode determined by the uplink reference signal resource indication refers to a transmitting mode same as that of an indicated uplink reference signal, such as a transmitting beam or a transmitting port.

The receiving mode includes at least one of: a receiving beam, a receiving port, a receiving resource, a reference-signal sequence, a receiving precoding matrix (in an analog manner, a digital manner or a hybrid manner), a receiver algorithm, a synchronization signal resource indication and a reference signal resource indication. The reference signal resource indication includes an uplink reference signal resource indication and/or a downlink reference signal resource indication. The receiving mode determined by the synchronization signal resource indication and the downlink reference signal resource indication refers to a certain receiving mode (e.g., a mode with the best receive performance, the minimum PL, or the maximum RSRP), such as a receiving beam and a receiving port, corresponding to a synchronization signal resource or a downlink reference signal resource for receiving an indication. The receiving mode determined by the uplink reference signal resource indication refers to a downlink receiving mode, such as a receiving beam or a receiving port, obtained by a receiving mode same as that of an indicated uplink reference signal using a reciprocity between the uplink and downlink or an association of uplink and downlink reference signals.

The beam may be a resource (e.g., a transmitter end precoding, a receiver end precoding, an antenna port, an antenna weight vector, an antenna weight matrix and etc.). A beam serial number may be replaced with a resource index, since the beam may be bound to some time-frequency code resources for a transmission. The beam may also be a transmission (transmitting/receiving) mode. The transmission mode may include space division multiplexing, frequency-domain/time-domain diversity or the like.

The beam indication refers to that a transmitter end may indicate through a current reference signal and an antenna port, and a reference signal (or a standard reference signal) and an antenna port scanned by the base station or fed back and reported by the UE satisfying a quasi co-location (QCL) assumption.

The receiving beam refers to a beam at the receiver end, which does not need to be indicated, or a beam resource at the receiver end, which is indicated by the transmitter end through the QCL of the current reference signal and the antenna port with the reference signal (or the standard reference signal) and the antenna port scanned by the base station or fed back and reported by the UE.

The channel characteristic includes a characteristic of a physical propagation channel, such as a horizontal transmit azimuth, a vertical transmit azimuth, a horizontal receive azimuth, a vertical receive azimuth and so on, and also includes characteristics of radio-frequency and baseband circuits, such as an antenna element pattern, an antenna group, an antenna panel, an antenna subarray, a transceiving unit (TXRU), a receiving beam set, antenna placement, a time offset, a frequency offset and phase noise of a baseband and etc.

Parameters related to the quasi co-location (QCL) at least include: Doppler spread, Doppler shift, delay spread, average delay and an average gain, and may also include spatial parameter information, such as an arrival angle, a spatial correlation of the receive beam, the average delay and a time-frequency channel response correlation (including phase information).

The association of uplink and downlink reference signals refers to that a spatial parameter characteristic of an uplink (downlink) reference signal may be determined through a spatial parameter characteristic of a channel experienced by the downlink (uplink) reference signal.

The above association is also referred to satisfying the QCL assumption, or satisfying a spatial reciprocity QCL assumption. Specifically, a transmitting beam of the uplink reference signal may be determined through a receiving beam corresponding to the downlink reference signal, a transmitting beam of the downlink reference signal may be determined through a receiving beam corresponding to the uplink reference signal, a receiving beam of the uplink reference signal may be determined through a transmitting beam corresponding to the downlink reference signal, and a receiving beam of the downlink reference signal may be determined through a transmitting beam corresponding to the uplink reference signal.

In the embodiments of the present application, for ease of description, the base station and the user equipment (UE) are used for description, which are not intended to limit the present application. In the implementation process, the base station and the UE may be replaced with names of various communication nodes, such as a NodeB (NB), a gNB, a transmitter receiver point (TRP), an access point (AP), a station, a user, a station (STA), a relay, a terminal or the like.

In the alternative embodiments of the present application, the meaning of a beam (group) is a beam or a beam group.

As shown in FIG. 1, a power control method of the present application includes steps described below.

In step 101, at least one piece of configuration information is received, where the configuration information includes at least one sounding reference signal resource set, the sounding reference signal resource set includes at least one sounding reference signal resource, the SRS resource set is identified by an SRS resource set index (ID), and the SRS resource is identified by a first SRS resource index; at least one power control parameter set is received; and an association one between the SRS resource set and a power control parameter is received, or an association two between an SRS and a power control parameter is received.

In step 102, a power control parameter of an SRS corresponding to the SRS resource is determined according to the received configuration information, the received power control parameter set and one of the association one or association two.

Figure 2:
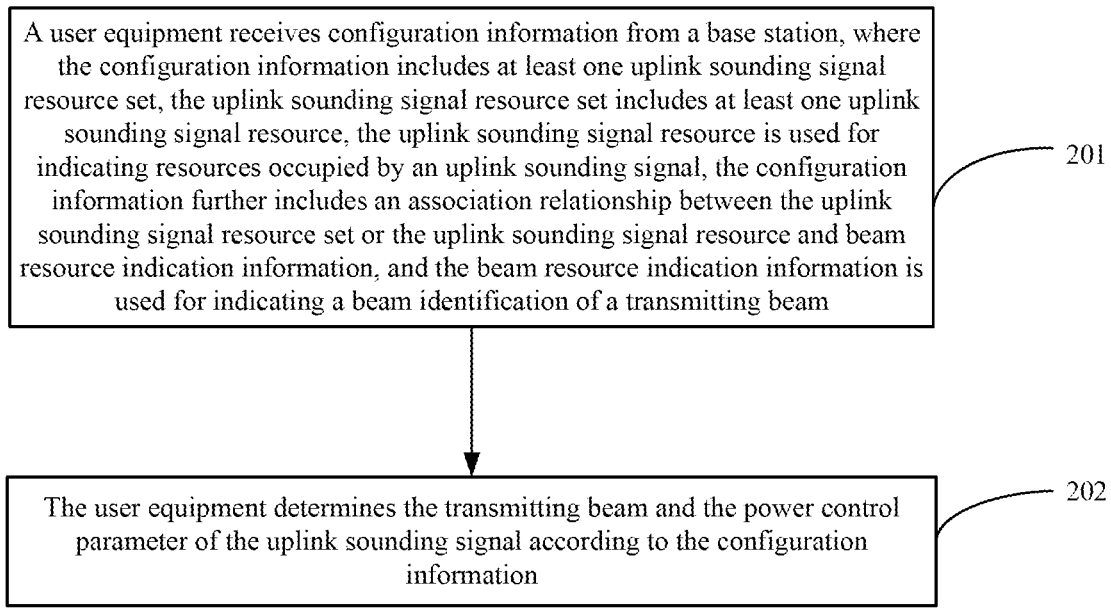
FIG. 2 is a flowchart of a power control method according to an embodiment of the present application.

As shown in FIG. 2, a power control method of the present application includes steps described below.

In step 201, a user equipment receives configuration information from a base station, where the configuration information includes at least one SRS resource set, the SRS includes at least one SRS resource, the SRS resource is used for indicating resources occupied by an SRS and an association relationship between one of the SRS resource set or the SRS resource and beam resource indication information is received from the base station, the beam resource indication information is used for indicating a beam identification of a transmitting beam.

In some embodiments, the configuration information is carried in any one of types of messages:
 a radio resource control (RRC) message, a media access control (MAC) control element message, and physical layer signaling.

In some embodiments, each SRS resource set includes at least one power control parameter set, and the power control parameter set includes J sets of SRS open-loop power control parameters, K sets of SRS pathloss measurement parameters, and L sets of SRS close-loop power control parameters, where J is an integer greater than or equal to 1, K is an integer greater than or equal to 0, and L is an integer greater than or equal to 0.

In some embodiments, the open-loop power control parameter includes at least one of:
 target receiving power, a power offset, or a pathloss compensation factor.

The pathloss measurement parameter includes at least one of:
 a resource indication of at least one downlink reference signal for a pathloss measurement, or a rule for processing a pathloss value measured by the downlink reference signal.

The closed-loop power control parameter includes a closed-loop power adjustment amount.

In some embodiments, the downlink reference signal includes any one of or any combination of followings:
 a designated channel state information reference signal, an auxiliary synchronization signal in a synchronization signal, a demodulation reference signal of a primary broadcast channel in a synchronization signal, or a designated tracking reference signal.

In some embodiments, the rule for processing the pathloss value measured by the downlink reference signal specifically includes:
 comparing the pathloss value measured by the downlink reference signal with a preset pathloss threshold value, and performing a weighted average on pathloss values less than the pathloss threshold value according to preset weight values, so as to obtain the pathloss value of the SRS.

In step 202, the UE determines the transmitting beam and the power control parameter of the SRS according to the configuration information and the association relationship.

In some embodiments, when the power control parameter of the SRS is determined, the SRS resource satisfies any one of following conditions or any combination of any two or more of the following conditions:
 the SRS resource set is configured to be aperiodic;
 the SRS resource set is configured to be semi-static;
 a number of SRS resources in the SRS resource set is equal to 1;
 a number of repetitions of SRS resources in the SRS resource set is equal to 1;
 beam resource indication information associated with one of the SRS resource set or the SRS resource is same as part or all of beam resource indication information associated with the power control parameter of the physical uplink shared channel;
 the beam resource indication information associated with the SRS resource set or the SRS resource and the part or all of beam resource indication information associated with the power control parameter of the physical uplink shared channel satisfy a pre-defined QCL relationship; and
 a grant type of the SRS resource set or SRS resource is same as a grant type associated with the power control parameter of the physical uplink shared channel.

The power control method further includes a step described below. A power control parameter in the SRS resource set is replaced with a power control parameter of the physical uplink shared channel.

In some embodiments, the step in which the power control parameter in the SRS resource set is replaced with the power control parameter of the physical uplink shared channel specifically includes any one of followings:
 all power control parameters in the SRS resource set are replaced with all power control parameters of a physical uplink shared channel associated with the beam resource indication information which is associated with the SRS resource set or the SRS resource;
 part of power control parameters in the SRS resource set are replaced with part of power control parameters of the physical uplink shared channel associated with the beam resource indication information which is associated with the SRS resource set or the SRS resource;
 all power control parameters in the SRS resource set are replaced with all power control parameters of a physical uplink shared channel associated with the grant type which is associated with the SRS resource set or the SRS resource; or
 part of power control parameters in the SRS resource set are replaced with part of power control parameters of the physical uplink shared channel associated with the grant type which is associated with the SRS resource set or the SRS resource.

In some embodiments, the step in which the power control parameter in the SRS resource set is replaced with the power control parameter of the physical uplink shared channel specifically includes any one of followings:
 the target receiving power in the SRS resource set is replaced with a sum of target receiving power of the physical uplink shared channel and a power offset value in the SRS resource set;
 a pathloss compensation factor in the SRS resource set is replaced with a pathloss compensation factor of the physical uplink shared channel;
 a reference signal resource indication of a pathloss estimation configured for the SRS is replaced with a reference signal resource indication of a pathloss estimation configured for the physical uplink shared channel; or
 a closed-loop power adjustment amount configured for the SRS resource set is replaced with a closed-loop power adjustment amount configured for the physical uplink shared channel.

In some embodiments, when the SRS resource set includes multiple power offset values, a correspondence between these power offset values and a category of the SRS is pre-defined by the base station and the user equipment or indicated by the base station in the configuration information, and the control method further includes a step described below.

The user equipment determines to use one or more power offset values in the SRS resource set according to the category of the SRS.

In some embodiments, the method further includes steps described below.

The user equipment receives from the base station an association relationship between the power control parameter set of the SRS and one of the SRS resource set or the SRS resource.

The user equipment determines the power control parameter of the SRS according to the association relationship between the power control parameter set and one of the SRS resource set or the SRS resource.

In some embodiments, the configuration information further includes an indication of the base station to the user equipment, and the indication is used for indicating whether the UE uses part or all of power control parameters of the physical uplink shared channel as part or all of power control parameters of the SRS resource set.

The control method further includes a step described below.

The user equipment uses part or all of the power control parameters of the physical uplink shared channel as part or all of the power control parameters in the SRS resource set according to the indication.

In some embodiments, when each SRS resource set does not include the power control parameter set, the control method further includes steps described below.

The user equipment determines the power control parameters of the SRS in any one of following manners:
   the user equipment uses a power control parameter in user equipment-level configuration parameters from the base station as the power control parameter of the SRS;
   the user equipment uses a power control parameter in cell-level configuration parameters from the base station as the power control parameter of the SRS;
   the user equipment uses a final transmitting power of a physical random access process as the transmitting power of the SRS; or
   the user equipment uses target power of the physical random access process as target receiving power of the SRS, and a pathloss obtained by measuring a synchronization signal block as a pathloss of the SRS, and calculates the transmitting power of the SRS.

In an embodiment of the present application, the user equipment determines that power control parameters of SRSs occupying multiple SRS resources in a same SRS resource set are the same.

In an embodiment of the present application, according to a preset number of periods maintaining a same transmitting power, the user equipment determines that power control parameters of SRSs occupying multiple SRS resources in a same SRS resource set in the number of periods are the same.

In some embodiments, when the configuration information further includes a number of repetitions of SRS transmissions, the control method further includes a step described below.

The user equipment adjusts the power control parameter of the SRS according to the number of repetitions of transmissions.

An embodiment of the present application further provides a power control method. The power control method includes a step described below.

A power control parameter and/or a transmitting beam resource of a physical uplink shared channel is used to replace a power control parameter and/or a transmitting beam resource of a physical uplink control channel, if the physical uplink shared channel and the physical uplink control channel satisfy any one of following conditions or any combination of any two or more of the following conditions.

The physical uplink shared channel and the physical uplink control channel are in a same scheduling unit.

The physical uplink shared channel and the physical uplink control channel are frequency-divided.

The physical uplink shared channel and the physical uplink control channel have the same transmitting beam.

A transmitting beam of the physical uplink shared channel and a transmitting beam of the physical uplink control channel satisfy a pre-defined QCL relationship.

Figure 3:
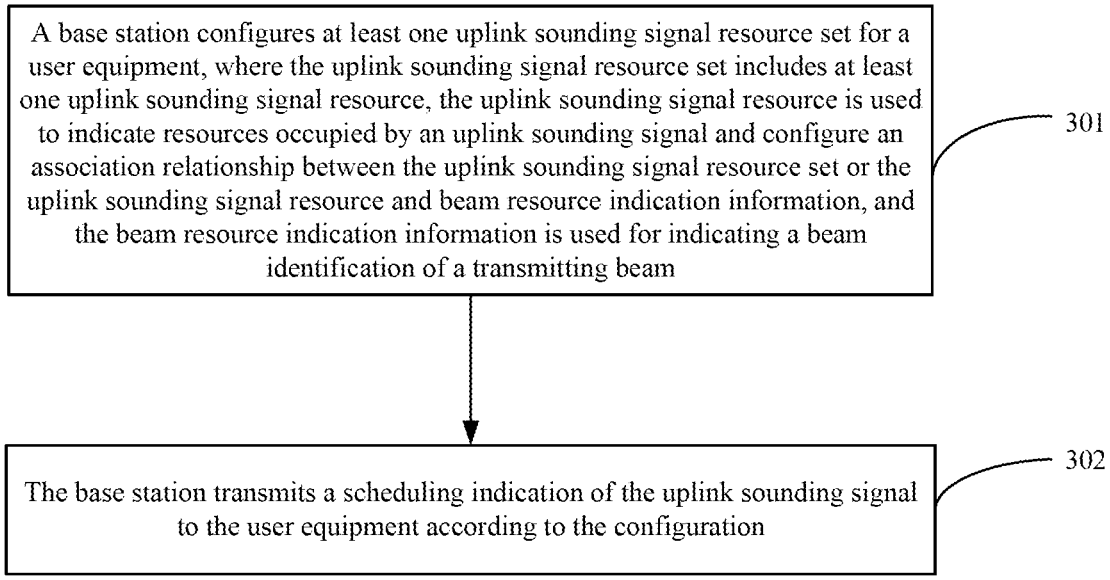
FIG. 3 is a flowchart of a power control method according to an embodiment of the present application.

As shown in FIG. 3, an embodiment of the present application further provides a power control method. The power control method includes steps described below.

In step 301, a base station configures at least one SRS resource set for a user equipment, where the SRS resource set includes at least one SRS resource, the SRS resource is used to indicate resources occupied by an SRS and configure an association relationship between the SRS resource set or the SRS resource and beam resource indication information, and the beam resource indication information is used for indicating a beam identification of a transmitting beam.

In some embodiments, each SRS resource set includes at least one power control parameter set, and the power control parameter set includes J sets of SRS open-loop power control parameters, K sets of SRS pathloss measurement parameters, and L sets of SRS close-loop power control parameters, where J is an integer greater than or equal to 1, K is an integer greater than or equal to 0, and L is an integer greater than or equal to 0.

In some embodiments, the open-loop power control parameter includes at least one of:
   target receiving power, a power offset, or a pathloss compensation factor.

The pathloss measurement parameter includes at least one of:
   a resource indication of at least one downlink reference signal for a pathloss measurement, or a rule for processing a pathloss value measured by the downlink reference signal.

The closed-loop power control parameter includes a closed-loop power adjustment amount.

In some embodiments, the downlink reference signal includes any one of or any combination of followings:
   a designated channel state information reference signal, an auxiliary synchronization signal in a synchronization signal, a demodulation reference signal of a primary broadcast channel in a synchronization signal, or a designated tracking reference signal.

In some embodiments, the rule for processing the pathloss value measured by the downlink reference signal specifically includes:
   comparing the pathloss value measured by the downlink reference signal with a preset pathloss threshold value, and performing a weighted average on a pathloss value less than the pathloss threshold value according to preset weight values, so as to obtain the pathloss value of the SRS.

In some embodiments, the configuration information includes any one of types of messages:
   a radio resource control (RRC) message, an MAC control element message, or physical layer signaling.

In some embodiments, the SRS resource set further includes multiple power offset values, and a correspondence between the power offset values and a category of the SRS is pre-defined by the base station and the UE or indicated by the base station.

It should be noted that when the UE receives the correspondence between the power offset values and the category of the SRS, the UE determines to use one or more power offset values in the SRS resource set according to the category of the SRS.

In some embodiments, the SRS resource set further includes an association relationship between the power control parameter set of the SRS and the SRS resource set or SRS resource.

It should be noted that when the UE receives an association relationship between the power control parameter set of the SRS and one of the SRS resource set or the SRS resource, the UE determines the power control parameter of the SRS according to the association relationship between the power control parameter set and one of the SRS resource set or the SRS resource.

In some embodiments, the control method further includes that the base station indicates whether the UE uses part or all of power control parameters of the physical uplink shared channel as part or all of power control parameters in the SRS resource set.

It should be noted that when the UE receives the indication, the UE uses part or all of the power control parameters of the physical uplink shared channel as part or all of the power control parameters in the SRS resource set according to the indication.

In some embodiments, the SRS resource set further includes a number of repetitions of transmitting the SRS.

It should be noted that when the UE receives the number of repetitions of transmitting the SRS, the UE adjusts the power control parameter of the SRS according to the number of repetitions of transmitting.

In step 302, the base station transmits a scheduling indication of the SRS to the UE according to the configuration.

An embodiment of the present application further provides a computer-readable storage medium, which is configured to store one or more programs executable by one or more processors to implement steps of the power control method described above.

Figure 4:
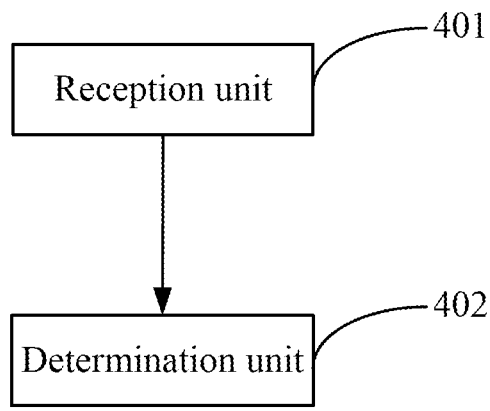
FIG. 4 is a structural diagram of a user equipment according to an embodiment of the present application.

As shown in FIG. 4, an embodiment of the present disclosure further provides a user equipment. The user equipment includes a reception unit 401 and a determination unit 402.

The reception unit 401 is configured to receive configuration information from a base station, where the configuration information includes at least one SRS resource set, the SRS resource set includes at least one SRS resource, the SRS resource is used for indicating resources occupied by an SRS and receiving an association relationship between the SRS resource set or SRS resource from the base station and beam resource indication information, and the beam resource indication information is used for indicating a beam identification of a transmitting beam.

The determination unit 402 is configured to determine a transmitting beam and a power control parameter of the SRS according to the configuration information.

In some embodiments, the SRS resource set further includes at least one power control parameter set, and the power control parameter set includes J sets of SRS open-loop power control parameters, K sets of SRS pathloss measurement parameters, and L sets of SRS close-loop power control parameters, where J is an integer greater than or equal to 1, K is an integer greater than or equal to 0, and L is an integer greater than or equal to 0.

In some embodiments, the open-loop power control parameter includes at least one of: target receiving power, a power offset, or a pathloss compensation factor.

The pathloss measurement parameter includes at least one of:
a resource indication of at least one downlink reference signal for a pathloss measurement, or a rule for processing a pathloss value measured by the downlink reference signal.

The closed-loop power control parameter includes a closed-loop power adjustment amount.

In some embodiments, the downlink reference signal includes any one of or any combination of followings:
a designated channel state information reference signal, an auxiliary synchronization signal in a synchronization signal, a demodulation reference signal of a primary broadcast channel in a synchronization signal, and a designated tracking reference signal.

In some embodiments, the rule for processing the pathloss value measured by the downlink reference signal specifically includes:
comparing the pathloss value measured by the downlink reference signal with a preset pathloss threshold value, and performing a weighted average on a pathloss value less than the pathloss threshold value according to preset weight values, so as to obtain the pathloss value of the SRS.

In some embodiments, the configuration information includes any one of types of messages:
a radio resource control message, an MAC control element message, and physical layer signaling.

In some embodiments, a step in which the determination unit 402 determines the power control parameter of the SRS specifically includes a step described below.

When the power control parameter of the SRS is determined, if the SRS resource satisfies any one of following conditions or any combination of any two or more of the following conditions, the power control parameter in the SRS resource set is replaced with the power control parameter of the physical uplink shared channel:
the SRS resource set is configured to be aperiodic;
the SRS resource set is configured to be semi-static;
a number of SRS resources in the SRS resource set is equal to 1;
a number of repetitions of SRS resources in the SRS resource set is equal to 1;
beam resource indication information associated with the SRS resource set or SRS resource is same as part or all of beam resource indication information associated with the power control parameter of the physical uplink shared channel;
the beam resource indication information associated with the SRS resource set or SRS resource and the part or all of the beam resource indication information associated with the power control parameter of the physical uplink shared channel satisfy a pre-defined quasi-co location relationship; or
a grant type of the SRS resource set or the SRS resource is same as a grant type associated with the power control parameter of the physical uplink shared channel.

In some embodiments, the step in which the power control parameter in the SRS resource set is replaced with the power control parameter of the physical uplink shared channel specifically includes any one of following steps:
all power control parameters in the SRS resource set are replaced with all power control parameters of a physical uplink shared channel associated with the beam resource indication information which is associated with the SRS resource set or the SRS resource;

part of power control parameters in the SRS resource set are replaced with part of power control parameters of the physical uplink shared channel associated with the beam resource indication information which is associated with the SRS resource set or the SRS resource;

all power control parameters in the SRS resource set are replaced with all power control parameters of a physical uplink shared channel associated with the grant type which is associated with the SRS resource set or the SRS resource; or part of power control parameters in the SRS resource set are replaced with part of power control parameters of the physical uplink shared channel associated with the grant type which is associated with the SRS resource set or the SRS resource.

In some embodiments, the step in which a power control parameter in the SRS resource set is replaced with a power control parameter of the physical uplink shared channel specifically includes any one of followings:

target receiving power in the SRS resource set is replaced with a sum of target receiving power of the physical uplink shared channel and a power offset value in the SRS resource set;

a pathloss compensation factor in the SRS resource set is replaced with a pathloss compensation factor of the physical uplink shared channel;

a reference signal resource indication of a pathloss estimation configured for the SRS is replaced with a reference signal resource indication of a pathloss estimation configured for the physical uplink shared channel; or a closed-loop power adjustment amount configured for the SRS resource set is replaced with a closed-loop power adjustment amount configured for the physical uplink shared channel.

In some embodiments, the step in which the determination unit 402 determines the power control parameter of the SRS specifically includes steps described below.

When the SRS resource set includes multiple power offset values, a correspondence between the power offset values and a category of the SRS is pre-defined by the base station and the user equipment or indicated by the base station in the configuration information, and the user equipment determines to use one or more power offset values in the SRS resource set according to the category of the SRS.

In some embodiments, the step in which the determination unit 402 determines the power control parameter of the SRS specifically includes steps described below.

The user equipment receives from the base station an association relationship between the power control parameter set of the SRS and one of the SRS resource set or the SRS resource.

The user equipment determines the power control parameter of the SRS according to the association relationship between the power control parameter set and one of the SRS resource set or the SRS resource.

In some embodiments, the step in which the determination unit 402 determines the power control parameter of the SRS specifically includes steps described below.

The configuration information further includes an indication from the base station to the user equipment, and the indication is used for indicating whether the user equipment uses part or all of the power control parameters of the physical uplink shared channel as part or all of the power control parameters in the SRS resource set.

The user equipment uses part or all of the power control parameters of the physical uplink shared channel as part or all of the power control parameters in the SRS resource set according to the indication.

In some embodiments, the step in which the determination unit 402 determines the power control parameter of the SRS specifically includes steps described below.

When each SRS resource set does not include the power control parameter set, the user equipment determines the power control parameter of the SRS in any one of following manners:

the user equipment uses a power control parameter in user equipment-level configuration parameters from the base station as the power control parameter of the SRS;

the user equipment uses a power control parameter in cell-level configuration parameters from the base station as the power control parameter of the SRS;

the user equipment uses final transmitting power of a physical random access process as transmitting power of the SRS; or the user equipment uses target power of the physical random access process as target receiving power of the SRS and a pathloss obtained by measuring a synchronization signal block as a pathloss of the SRS, and calculates the transmitting power of the SRS.

In an embodiment of the present application, SRSs, which are determined by the determination unit 402 and occupy multiple SRS resources in a same SRS resource set, have same power control parameters.

In an embodiment of the present application, the determination unit 402 determines that power control parameters of SRSs occupying multiple SRS resources of a same SRS resource set in the number of periods are the same according to a preset number of periods maintaining same transmitting power.

In some embodiments, the configuration information further includes the number of repetitions of transmitting the SRS.

The determination unit 402 is further configured to implement a step described below.

The user equipment adjusts the power control parameter of the SRS according to the number of repetitions of transmitting.

Figure 5:
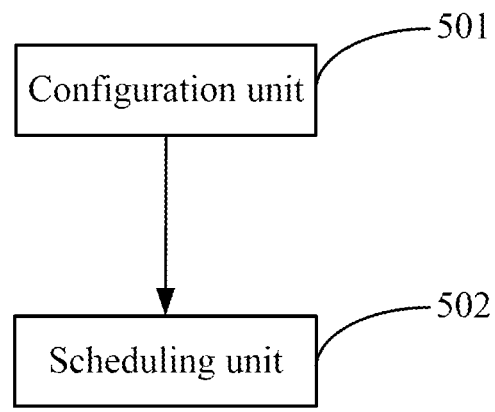
FIG. 5 is a structural diagram of a base station according to an embodiment of the present application.

As shown in FIG. 5, an embodiment of the present disclosure further provides a base station. The base station includes a configuration unit 501 and a scheduling unit 502.

The configuration unit 501 is configured to configure at least one SRS resource set for a UE, where the SRS resource set includes at least one SRS resource, the SRS resource is used for indicating resources occupied by an SRS and configuring an association relationship between the SRS resource set or SRS resource and beam resource indication information, and the beam resource indication information is used for indicating a beam identification of a transmitting beam.

The scheduling unit 502 is configured to transmit a scheduling indication of the SRS to the user equipment according to the configuration.

In some embodiments, each SRS resource set includes at least one power control parameter set, and the power control parameter set includes J sets of SRS open-loop power control parameters, K sets of SRS pathloss measurement parameters, and L sets of SRS close-loop power control parameters, where J is an integer greater than or equal to 1, K is an integer greater than or equal to 0, and L is an integer greater than or equal to 0.

In some embodiments, the open-loop power control parameter includes at least one of:
  target receiving power, a power offset, or a pathloss compensation factor.

The pathloss measurement parameter includes at least one of:
  a resource indication of at least one downlink reference signal for a pathloss measurement, or a rule for processing a pathloss value measured by the downlink reference signal.

The closed-loop power control parameter includes a closed-loop power adjustment amount.

In some embodiments, the downlink reference signal includes any one of or any combination of followings:
  a designated channel state information reference signal, an auxiliary synchronization signal in a synchronization signal, a demodulation reference signal of a primary broadcast channel in a synchronization signal, or a designated tracking reference signal.

In some embodiments, the rule for processing the pathloss value measured by the downlink reference signal specifically includes:
  comparing the pathloss value measured by the downlink reference signal with a preset pathloss threshold value, and performing a weighted average on a pathloss value less than the pathloss threshold value according to preset weight values, so as to obtain the pathloss value of the SRS.

In some embodiments, configuration information includes any one of types of messages:
  a radio resource control message, an MAC control element message, and physical layer signaling.

In some embodiments, the SRS resource set further includes multiple power offset values, and a correspondence between the power offset values and a category of the SRS is pre-defined by the base station and the user equipment or indicated by the base station in the configuration information.

It should be noted that when the user equipment receives the correspondence between the power offset values and the category of the SRS, the user equipment determines to use one or more power offset values in the SRS resource set according to the category of the SRS.

In some embodiments, the SRS resource set further includes an association relationship between the power control parameter set of the SRS and the SRS resource set or the SRS resource.

It should be noted that when the user equipment receives the association relationship between the power control parameter set of the SRS and the SRS resource set or the SRS resource, the user equipment determines the power control parameter of the SRS according to the association relationship between the power control parameter set and the SRS resource set or the SRS resource.

In some embodiments, the scheduling unit 502 is further configured to indicate whether the user equipment uses part or all of power control parameters of the physical uplink shared channel as part or all of power control parameters in the SRS resource set.

It should be noted that when the user equipment receives the indication, the user equipment uses part or all of power control parameters of the physical uplink shared channel as part or all of power control parameters in the SRS resource set according to the indication.

In some embodiments, the SRS resource set further includes a number of repetitions of transmitting the SRS.

It should be noted that when the user equipment receives the number of repetitions of transmitting the SRS, the UE adjusts the power control parameter of the SRS according to the number of repetitions of transmitting.

The embodiments of the present application further provide several alternative embodiments to further explain the present application. It should be noted that the alternative embodiments are just for better illustration of the present application and do not limit the present application in any improper way. Following embodiments may exist separately, and technical features of different embodiments may be combined into one embodiment for a joint use.

The following provides a configuration of an SRS power offset value.

The base station configures at least one set of power offset values of the SRS for the user equipment.

Each set of power offset values of the SRS includes at least one power offset value of the SRS, and each power offset value of the SRS is used for supporting a different scenario. There are some examples.

1) Each set of power offset values of the SRS includes three values, which are used for a periodic SRS transmission, an aperiodic SRS transmission and a non-persistent SRS transmission respectively.

2) Alternatively, each set of power offset values of the SRS includes two values, which are used for different SRS transmission given trigger types respectively.

A correspondence between a position of a power offset value of the SRS in the set of power offset values of the SRS and a scenario is pre-defined.

Each set of power offset values of the SRS is used for supporting a different type of the SRS transmission. There are some examples.

1) two sets of power offset values of the SRS support two types of the SRS transmission, where a first set is used for supporting a power calculation of an SRS which shares a power control parameter with the PUSCH, and a second set is used for supporting power calculations of SRSs with other types.

2) Alternatively, three sets of power offset values of the SRS support three types of the SRS transmission, where a first set is used for supporting a power calculation of the SRS which shares the power control parameter with the PUSCH, a second set is used for supporting a power calculation of an SRS used for obtaining downlink channel state information (CSI), and a third set is used for supporting power calculations of SRSs with other types.

3) Alternatively, six sets of power offset values of the SRS support six types of the SRS transmission, where a first set is used for supporting a power calculation of the SRS which shares the power control parameter with the PUSCH, a second set is used for supporting a power calculation of an SRS used for obtaining CSI, third, fourth and fifth sets are used for supporting power calculations of the SRS of types U1, U2 and U3 used for uplink beam management respectively, and a sixth set is used for supporting power calculations of the SRS with other types.

4) Alternatively, one set of power offset values of the SRS supports only one type of the SRS transmission, and is used for all types of the SRS transmission described above.

When the set of power offset values of the SRS has a number greater than 1, a correspondence between each set of power offset values of the SRS and the category of the SRS is pre-defined or indicated by the base station.

The user equipment determines a power offset value according to the scenario of the SRS transmission and the category of the SRS.

The manner of being indicated by the base station includes at least one of followings.

1) The base station configures a correspondence between each set of power offset values of the SRS and the category of the SRS. For example, a mapping table of supported correspondences is pre-defined, and the base station configures one item in the mapping table for the UE by using RRC information.

2) Alternatively, the base station indicates a corresponding SRS power set in the SRS resource set. For example, the base station indicates an identity (ID) of a set of power offset values of the SRS.

3) Alternatively, the base station indicates a corresponding SRS power set in a message activating or triggering the SRS. For example, the base station indicates the ID of the set of power offset values of the SRS.

The above SRS power offset value may be one of following manners.

In manner one, on the basis of the cell specific part (also called p0-Nominal) and the UE specific part (also called p0-UE) of the target power configured by the base station, sets of power offset values of various SRSs are configured to reflect differences of different scenarios. In this case, the target power of the SRS consists of three parts: the cell specific part, the UE specific part and the power offset value of the SRS. The target power of the cell specific part and the UE specific part may be values specially configured for the SRS, or may be used as values configured for the PUSCH, explicitly configured or indicated by the base station, or implicitly indicates this information. See following examples for details. The SRS power offset value is specially configured for the SRS.

In manner two, on the basis of the cell specific part (also called p0-Nominal) of the target power configured by the base station, the UE specific part and the power offset value of the SRS are combined and configured, the combined two parts may be called an SRS power offset value, or the UE specific target power value of the SRS. Since the combined parts still need to reflect the differences of the above different scenarios, the set of power offset values of the SRS described above in this example may be replaced by the name of the combined two parts. The target power of the cell specific part may be a value specially configured for the SRS, or may be used as a value configured for the PUSCH, explicitly configured or indicated by the base station, or implicitly indicates this information. See examples shown later for details. The SRS power offset value (a combined value of the UE specific target power value of the SRS and the power offset value of the SRS) is specially configured for the SRS.

The following provides configurations of SRS-specific j, k and l and a manner corresponding to SRS scheduling information.

The base station configures J sets of SRS open-loop power control parameters for the UE, and each set of SRS open-loop power control parameters includes at least one of following: target receiving power P0, or a pathloss compensation factor alpha, where J is an integer greater than or equal to 1. Each set of SRS open-loop power control parameters is identified by j, where j is an integer, and j is greater than or equal to 0 and less than J.

The base station configures K sets of SRS pathloss measurement parameters for the UE, and each set of SRS pathloss measurement parameters includes at least one of: a reference signal (RS) resource type indication for a pathloss measurement, an RS resource indication for the pathloss measurement, and a rule for processing multiple pathloss values of reference signals for the pathloss measurement, where K is an integer greater than or equal to 0. Each set of SRS pathloss measurement parameters is identified by k, where k is an integer, and k is greater than or equal to 0 and less than K.

The base station configures L sets of SRS closed-loop power control parameters for the UE, and each set of SRS closed-loop power control parameters includes at least one of: an SRS closed-loop power control identification, where L is an integer greater than or equal to 0. Each set of SRS closed-loop power control parameters is identified by l, where l is an integer, and l is greater than 0 and less than L.

The base station configures at least one SRS resource set for the UE, and each SRS resource set includes at least one SRS resource. Each SRS resource indicates resources occupied by the SRS, which include parameters of time domain, frequency domain, a code domain and others. The SRS resource is associated with the transmitting beam, this association relationship may be configured by a radio resource control (RRC) message, or may be indicated by an MAC control element (CE) message, or may be indicated by physical layer signaling such as downlink control information (DCI).

The base station indicates the UE to transmit an SRS, at least including an indication of the SRS resource set and/or the SRS resource. The power control parameter corresponding to the SRS is determined in one of following manners.

In manner one, relationships between j, k and l and the SRS resource set or an SRS resource indication (SRI) are configured.

The base station configures or indicates an association relationship between an SRS open-loop power control parameter and one of the SRS resource or SRS resource set.

When K is greater than 0, the base station configures or indicates an association relationship between an SRS pathloss measurement parameter and one of the SRS resource or the SRS resource set.

When L is greater than 0, the base station configures or indicates an association relationship between an SRS closed-loop power control parameter and one of the SRS resource or SRS resource set.

According to the above association relationships, the UE determines parameters, including the SRS open-loop power control parameter, the SRS pathloss measurement parameter and the SRS closed-loop power control parameter, required for calculating the transmitting power for the SRS.

In manner two: j, k and l are configured in the SRS resource set respectively, and one SRS resource set supports one set or multiple sets of power control parameters.

J sets of SRS open-loop power control parameters configured by the base station for the UE are distinguished by SRS open-loop power control parameter identifications.

K sets of SRS pathloss measurement parameters configured by the base station for the UE are distinguished by SRS pathloss measurement parameter identifications.

L sets of SRS closed-loop power control parameters configured by the base station for the UE are distinguished by SRS closed-loop power control parameter identifications.

The base station carries the SRS open-loop power control parameter identifications, the SRS pathloss measurement parameter identifications and the SRS closed-loop power control parameter identifications in the SRS resource set. The UE calculates the transmitting power of all SRS resources in the SRS resource set by using same parameters.

If an SRS resource in the SRS resource set occupied more than one preset time unit, the UE uses same parameters to calculate the transmitting power, and take values at a uniform time.

Alternatively, the transmitting power calculated by the UE for one SRS resource is applied to all SRS resources in this SRS resource set, including SRS resources repeated in time domain.

The preset time unit is one of: an OFDM symbol, a slot, a subframe, a frame or a time unit in a future system.

The base station may also carry more than one set of following SRS power control parameter identifications in the SRS resource set: the SRS open-loop power control parameter identifications, the SRS pathloss measurement parameter identifications and the SRS closed-loop power control parameter identifications. The base station needs to indicate a correspondence between SRS power control parameter identifications and SRS resources. A set of power control parameters indicated by each set of SRS power control parameters is applied to a corresponding SRS resource.

In manner three: the base station configures associations among j, k and l, uses association IDs to apply the configuration, which support one or more sets of power control parameters.

The base station configures associations among the SRS open-loop power control parameters, the SRS pathloss measurement parameters, and the SRS closed-loop power control parameters, and indicates different association relationships between the above parameters by using SRS power control parameter association identifications.

The base station carries at least one SRS power control parameter association identification in the SRS resource set.

When the SRS power control parameter association identifications has a number of 1, the UE calculates the transmitting power of all SRS resources in the SRS resource set by using same parameters.

When the number of SRS power control parameter association identifications is more than 1, the base station needs to indicate a correspondence between the SRS power control parameter identifications and the SRS resources. A set of power control parameters indicated by each power control parameter association identification is applied to the corresponding SRS resource.

In the SRS resource set or in physical layer information triggering the SRS, the base station indicates a number of resource blocks (RBs) occupied by the SRS for the UE.

Through the above manners, the UE obtains the SRS open-loop power control parameters, the SRS pathloss measurement parameters, the SRS closed-loop power control parameters and the number of RBs occupied by the SRS, and uses these above parameters to calculate the transmitting power. For example, the following formula is an implementation manner.

$$P_{SRS,c}(i) = \min \begin{cases} P_{CMAX,c}(i), \\ 10\log_{10}(M_{SRS,c}(i)) + P_{0\_SRS,c}(j) + \alpha_{SRS,c}(j) * PL_{SRS,c}(k) + h_c(i,l) \end{cases}$$

In the formula, i is a time unit number, such as a subframe number, a slot number, and a number of an OFDM symbol; j is a number of an SRS open-loop power control parameter set, k is a number of an SRS pathloss measurement parameter set, and l is a number of an SRS closed-loop power control parameter set. $M_{SRS,c}(i)$ is the number of RBs occupied by the SRS, and this parameter may not exist. The SRS open-loop power control parameter set includes $a_{SRS,c}(j)$ and $P_{0\_SRS,c}(j)$, where $P_{0\_SRS,c}(j)$ consists of two parts: the cell specific part (also called p0-Nominal) and the UE specific part (also called p0-UE); $PL_{SRS,c}(k)$ is an SRS pathloss measurement parameter; $h_c(i,l)$ is an SRS closed-loop power control parameter, where l denotes an SRS closed-loop power control process identification, or a closed-loop power control loop identification.

How to select an SRS of the NR from SRS-specific j, k and l or from j1, k1 and l1 of the PUSCH to support different functions, such as the beam management, the uplink channel state information acquisition (UL CSI acquisition), and the downlink channel state information acquisition (DL CSI acquisition) is described below. The SRS for the beam management may further have different phases, such as U1, U2 and U3, where U1 is a training of uplink transmitting and receiving beams, U2 is a training of uplink receiving beams, and U3 is a training of uplink transmitting beams. A number of beams to be trained and levels of beams in U1, U2 and U3 may be different.

The SRS signal is more special. A part of the SRS transmission is for performing the beam training, that is, SRSs for the beam management function, and another part of the SRS transmission is for performing the channel sounding, that is, for acquiring channel state information. A transmitting beam of the former part may not be designated by the base station, especially for the beam training in an initial phase. The base station only schedules enough resources for the UE to transmit the SRS and indicates resources which require the UE to use a same transmitting beam, and the correspondence of resources and transmitting beams in some embodiments is determined by the UE. Training results are used by the base station as reference for indicating transmitting beams of subsequent SRS/PUSCH/PUCCH transmissions. With the SRS in the initial phase as the reference, the subsequent SRS transmissions, whether for the purpose of the beam training or the channel sounding, may possible take it as the reference.

The beam training in a non-initial phase is classified into following cases.

Case 1: It is dependent on a previous reference SRS transmitting beam.

For case 1, if a transmitting beam of the SRS to be transmitted is the same as the transmitting beam of the PUSCH, a same power control parameter may be used and a same closed-loop power control process may be shared.

If the SRS resource set to be transmitted has multiple SRS resources, its corresponding transmitting beam set includes the transmitting beam of the PUSCH, and it is also likely to share the power control parameter and closed-loop power control process of the PUSCH.

If the transmitting beam of the SRS to be transmitted is different from the transmitting beam of the PUSCH, but they are approximately the same as, that is a specific QCL relationship exists, the power control parameter and the closed-loop power control process may also be shared.

The specific QCL relationship described in the present application refers to that at least beam resources in transmitting resources of the SRS and the PUSCH have some similarity, such as a similar direction. Since the relationship between beams is generally measured by using a QCL parameter, the specific QCL relationship refers to a specific QCL assumption. For example, a specific part of parameters in the QCL parameter satisfy a certain threshold requirement, such as, a spatial parameter in the QCL parameter satisfies a certain threshold requirement. When compared beams are respectively uplink or downlink beams, since transmitter ends are different, it is inaccurate to use the QCL to measure a beam correlation. In this case, the beam correlation may be determined by using the association relationship of uplink and downlink parameter signals, and a spatial parameter characteristic of the uplink (downlink) reference signal may be determined through a spatial parameter characteristic of the channel experienced by the downlink (uplink) reference signal.

Case 2: It is not dependent on the previous reference SRS transmitting beam

For case 2, since it is not dependent on the previous reference SRS transmitting beam, it is better to perform independent power control.

For each of the above cases, the transmitting beam indicated by the base station to the UE is the same as the transmitting beam of the above-mentioned SRS used as reference, but the base station may change the receiving beam according to a scheduling condition, so the above case may be that the UE determines whether to share the power control parameter and the closed-loop power control process with the PUSCH according to conditions in some embodiments, and it is also necessary to support the base station to indicate whether to share the power control parameter and the closed-loop power control process with the PUSCH.

The base station configures SRS-specific power control parameters for the UE, and for that, references are made to the related description in the alternative embodiment 2.

The base station configures the power control parameter of the PUSCH for the UE, the description of which is as follows.

1) The base station configured J1 sets of PUSCH open-loop power control parameters for the UE, and each set of PUSCH open-loop power control parameters includes at least one of: PUSCH target receiving power P0, and a PUSCH pathloss compensation factor alpha, where J1 is an integer greater than or equal to 1. Each set of PUSCH open-loop power control parameters is identified by j1, where j1 is an integer, and j1 is greater than or equal to 0 and less than J1.

2) The base station configures K1 sets of PUSCH pathloss measurement parameters for the UE, and each set of PUSCH pathloss measurement parameters includes at least one of: at least one reference signal (RS) resource type indication for a pathloss measurement, an RS resource indication for the pathloss measurement, and a rule for processing multiple pathloss values of reference signals for the pathloss measurement, where K1 is an integer greater than or equal to 1. Each set of PUSCH pathloss measurement parameters is identified by k1, where k1 is an integer, and k1 is greater than or equal to 0 and less than K1.

3) The base station configured L1 sets of PUSCH closed-loop power control parameters, and each set of PUSCH closed-loop power control parameters includes at least one of: a PUSCH closed-loop power control identification, where L1 is an integer greater than or equal to 1. Each set of PUSCH closed-loop power control parameters is identified by l1, where l1 is an integer, and l1 is greater than 0 and less than L1.

The base station configures at least one SRS resource set for the UE, and each SRS resource set includes at least one SRS resource. Each SRS resource indicates resources occupied by the SRS, which includes parameters of time domain, frequency domain, a code domain and others. The SRS resource set indicates that the SRS resource may be periodic, aperiodic, or semi-static. Different SRS resource sets may be scheduled in different manners. For example, for the periodic manner, merely a configuration through RRC is required, and the UE transmits the SRS at a corresponding position (e.g., time-frequency domain). For the semi-static manner, a configuration through the RRC is required, MAC CE is used for activation, and the UE needs to transmit the SRS at a position indicated by the activated SRS resource set. For the aperiodic manner, a configuration through RRC is required, and physical layer signaling triggers the UE to transmit the SRS at a designated position. For the aperiodic manner, the MAC CE may further be required to activate part of SRS resource set configured through the RRC to reduce an indication overhead of the SRS resource set through physical layer trigger signaling.

The base station configures or indicates the association relationship between the SRS resource and the transmitting beam. This association relationship may be configured by an RRC message, or may be indicated by an MAC CE, or may be indicated by physical layer signaling such as DCI.

The base station indicates the UE to transmit the SRS in the above periodic manner, the aperiodic manner, or the semi-static manner, and the UE may determine an indication of the SRS resource set and/or the SRS resource. The power control parameters corresponding to the SRS are determined in one of following manners.

In manner one, the base station clearly indicates whether the SRS shares the power control of the PUSCH.

The base station indicates whether this SRS resource (set) shares the power control process with the PUSCH.

Whether the SRS resource (set) shares the power control process with the PUSCH may be: whether to share the open-loop power control parameters, the pathloss measurement parameters and the closed-loop power control process of the PUSCH, or indicating whether to share the open-loop power control parameters, the pathloss measurement parameters and the closed-loop power control process of the PUSCH respectively.

The base station uses the RRC signaling to configure, or uses the MAC CE to indicate, or uses the physical layer signaling to indicate whether the SRS resource (set) shares the power control process with the PUSCH.

In some embodiments, for a periodic SRS resource set, the base station uses the RRC signaling to configure whether to share information of the power control process with the PUSCH; for a semi-static SRS resource set, the base station may use the RRC signaling to configure, or uses the MAC CE to indicate, whether to share information of the power control process with the PUSCH; and for an aperiodic SRS resource set, the base station uses the RRC signaling or MAC CE or physical layer signaling to indicate whether to share information of the power control process with the PUSCH.

In manner two, the UE itself determines whether to share.

The UE determines whether to share the power control parameter and the closed-loop power control process of the PUSCH according to the correspondence between the SRS resource and the transmitting beam.

If the UE determines that the transmitting beam of a current SRS references a beam resource of a previously transmitted pilot, such as a transmitting beam of a previous SRS or a receiving beam of a previous CSI-RS, it is determined whether to share the power control parameter and the closed-loop power control process of the PUSCH according to a relationship between the transmitting beam of the SRS and the transmitting beam of the PUSCH.

If the UE determines that the transmitting beam of the current SRS does not reference the beam resources of the previously transmitted pilot, the SRS transmitting beam is unrelated to the power control parameter of the PUSCH.

For an SRS sharing the power control parameter and the closed-loop power control process with the PUSCH, the manner for determining j, k and l is as follows.

There is no need for a manner of a further indication, and whether beams are the same or the QCL relationship is used for the determination.

When a number of transmitting beams associated with the SRS resource set is 1, the UE compares the transmitting beams associated with the SRS resource set and beam resources associated with the power control parameter of the PUSCH to determine that:
1) same beams may be shared;
2) different beams satisfying a specific QCL relationship may be shared; and
3) different beams do not satisfy the specific QCL relationship, and a default set of SRS-specific power control resources independently configured is used.

When the number of transmitting beams associated in the SRS resource set is more than 1, and the transmitting power of these multiple transmitting beams is required to be the same,
1) when at least one of multiple transmitting beams of the SRS which are associated with the power control parameter of the PUSCH is same as a beam resource associated with the power control parameter of the PUSCH, and a parameter associated with this same beam resource in the PUSCH may be shared;
2) when at least one of multiple transmitting beams of the SRS which are associated with the power control parameter of the PUSCH and beam resources associated with the power control parameter of the PUSCH satisfy the specific QCL relationship, the parameter associated with this same beam resource in the PUSCH may be shared; and
3) when none of multiple transmitting beams of the SRS which are associated with the power control parameter of the PUSCH is the same as the beam resource associated with the power control parameter of the PUSCH or satisfy the specific QCL relationship, a default set of SRS-specific power control resources independently configured is used.

For a scenario without using beams, all SRS resources in the SRS resource set share the power control parameter of the PUSCH.

Alternatively, the SRS resource set matches power control parameters of the PUSCH according to the grant type. For example, a grant-free power control parameter of the PUSCH is used to a grant-free SRS resource set, and a grant-based power control parameter of the PUSCH is used to a grant-free SRS resource set. Alternatively, the grant-free power control parameter of the PUSCH is used to periodic and semi-static SRS resource sets, and the grant-based power control parameter of the PUSCH is used to the aperiodic SRS resource set.

The manner for a further indication is needed.

The base station indicates which power control parameters of the PUSCH are applied to the SRS resource. The indication manner includes followings.

For an independently configured SRS, the manner of determining the open-loop power control parameters, the pathloss measurement parameters and the closed-loop power control parameters references the alternative embodiment 2.

For a case where the SRS resource set and the PUSCH share the power control parameters, the base station indicates to the SRS resource set which open-loop power control parameters, pathloss measurement parameters and closed-loop power control parameters of the PUSCH are used.

For the SRS sharing the power control parameters of the PUSCH, following parameters are obtained from the power control parameters of the PUSCH: the target receiving power P0_PUSCH, alpha_PUSCH, a PL measurement configuration of the PUSCH, and the number of PUSCH closed-loop power control, and the power offset value needs to be determined according to the scenario of the SRS transmission and the category of the SRS. For details, references are made to the related description of embodiment 1. The transmitting power of the SRS is finally determined.

For the SRS sharing the power control parameter of the PUSCH, following parameters are obtained from the power control parameter of the PUSCH: the alpha_PUSCH, the PL measurement configuration of the PUSCH, and the number of PUSCH closed-loop power control, and the power offset value needs to be determined according to the scenario of the SRS transmission and the category of the SRS. The power offset value includes the UE-specific target power part, and the UE-specific target power of the PUSCH does not need to be shared.

For details, references are made to the related description of embodiment 1. Finally, the transmitting power of the SRS is determined.

The following provides an embodiment where the SRS resource set may not include the power control parameter configuration.

The base station configures at least one SRS resource set for the UE. Each SRS resource set includes at least one SRS resource.

The SRS resource set does not include the power control parameter when one of following conditions or a combination of multiple conditions is satisfied:
1) the SRS resource set is configured as periodic;
2) the SRS resource set is configured as semi-static;
3) a number of SRS resources in the SRS resource set is greater than 1;
4) a number of repetitions of SRS resources in the SRS resource set is greater than 1; 5) a number of antenna ports of SRS resources in the SRS resource set is 1;
6) transmitting beam resource information of the SRS resource in the SRS resource set is transparent to the base station; and
7) transmitting beam resource information is not configured in the SRS resource set, such as an SRI, a tracking reference signal resource indication (TRI), a transmitted precoding matrix indicator (TPMI), a synchronization signal block (SS block) indication, or a CSI-RS indication (CRI).

The manner of determining the power control parameter is one of followings.
1) The base station configures a set of parameters for the UE to calculate the power of the SRS resource in the SRS resource set satisfying the above conditions.
2) The base station configures a set of cell-level parameters to calculate the power of the SRS resource in the SRS resource set satisfying the above conditions of all UEs.
3) The UE adopts the final power of a physical random access channel (PRACH) process.
4) The UE measures one or more SS blocks, determines the PL, uses the target power value configured for the PRACH as P0_SRS and the following formula to calculate the transmitting power for all SRS resources in the SRS resource set.

$$P_{SRS,c}(i) = \min\left\{ \begin{array}{l} P_{CMAX,c}, \\ 10\log_{10}(M_{SRS,c}(i)) + P_{0\_SRS,c}(j) + PL_c(k) \end{array} \right\}$$

In some embodiments, one of the above manners is pre-determined to use.

In some embodiments, the base station configures or indicates to use one of the above manners.

The following provides an embodiment where the SRS resource set includes the default power control parameter configuration, and shares with the PUSCH when a certain condition is satisfied.

The base station configures at least one SRS resource set for the UE. Each SRS resource set includes at least one SRS resource.

At least one power control parameter set is configured for each SRS resource set.

1) When the SRS resource set only includes one power control parameter set, all SRS resources in the SRS resource set use this power control parameter set to calculate power.
2) When the SRS resource set includes more than one power control parameter set, for example N power control parameter sets (N>1), SRS resources in the SRS resource set are divided into N groups, and each group of SRS resources uses one corresponding power control parameter set to calculate the power.

The power control parameter set includes at least one of following parameters:
1) an SRS power offset value, P0_SRS_OFFSET;
2) SRS target receiving power, P0_SRS;
3) an SRS pathloss compensation factor, Alpha SRS;
4) a pathloss (PL) measurement parameter; or
5) an SRS closed-loop power control process.

An reference signal (RS) resource indication for a pathloss (PL) measurement estimation may share a same resource pool with the following pathloss measurement parameter of the PUSCH, that is, the base station configures a resource pool of PL measurement estimation parameters, and the SRS resource set only indicates a number in the resource pool.

The pathloss measurement parameter includes at least one of: a reference signal (RS)resource type indication for the pathloss measurement, a reference signal (RS) resource indication for the pathloss measurement, or a rule for processing multiple pathloss values of reference signals for the pathloss measurement.

The SRS closed-loop power control process refers to an SRS-specific closed-loop power control process, each cell may be configured with one or more processes, and SRS resource sets with a same process in each cell may share the closed-loop power adjustment amount.

The base station may configure following power control parameters of the PUSCH for the UE:
1) J1 sets of PUSCH open-loop power control parameters, where each set of PUSCH open-loop power control parameters includes at least one of: the target receiving power P0, or the pathloss compensation factor alpha, where J1 is an integer greater than or equal to 1;
2) K1 sets of PUSCH pathloss measurement parameters, where each set of PUSCH pathloss measurement parameters includes at least one of: the reference signal (RS) resource type indication for the pathloss measurement, the reference signal (RS) resource indication for the pathloss measurement, or the rule for processing multiple PL values of the RS for the pathloss measurement, where K1 is an integer greater than or equal to 1; and
3) L1 sets of PUSCH closed-loop power control parameters, where each set of PUSCH closed-loop power control parameters includes at least one of: a PUSCH closed-loop power control identification, where L1 is an integer greater than or equal to 1.

The base station further configures association relationships between the above power control parameters of the PUSCH and one of the beam resources or beam resource groups. For example, each of part or all of power control parameters in J1, K1 and L1 is associated with the beam resource indication information. For example, J1 is equal to 3, including J1_1, J1_2 and J1_3, where J1_1 and J1_2 establish an association relationship with SRI1 and SRI2 respectively. K1 is equal to 3, including K1_1, K1_2 and K1_3, where K1_1 and K1_2 establish an association relationship with SRI1 and SRI2 respectively. L1 is equal to 2, including L1_1 and L1_2, where L1_1 and L1_2 establish an association relationship with SRI1 and SRI2 respectively.

The base station uses beam resource information in physical layer information to indicate the UE to obtain the PUSCH open-loop power control parameter, the PUSCH pathloss measurement parameter and the PUSCH closed-loop power control parameter.

The base station may further use an index value of any one of the PUSCH open-loop power control parameter, PUSCH pathloss measurement parameter and PUSCH closed-loop power control parameter or a local beam resource number of a beam resource group corresponding to the index value to indicate the UE to obtain the PUSCH open-loop power parameter, the PUSCH pathloss measurement parameter and the PUSCH closed-loop power control parameter in the physical layer information. The advantage of doing so is saving the overhead of the physical layer beam resource indication.

The base station further configures an association relationship between the above power control parameters of the PUSCH and the grant type. For example, J1, K1 and L1 are associated with the grant type respectively. For example, J1 is equal to 3, including J1_1, J1_2 and J13, where J1_1 and J1_2 are associated with the grant-based type respectively, and J1_3 is associated with the grant-free type. K1 is equal to 3, including K1_1, K1_2 and K1_3, where K1_1 and K1_2 are associated with the grant-based type respectively, and K1_3 is associated with the grant-free type. L1 is equal to 2, including L1_1 and L1_2, where L1_1 is associated with the grant-based type, and L1_2 is associated with the grant-free type.

The base station indicates the beam resource information of the SRS to the UE in one of following manners.
1) The base station configures the association relationship between the SRS resource set or the SRS resource and the beam resource indication information in the radio resource control (RRC signaling). The association relationship may be configuring the beam resource indication information in the SRS resource set or the SRS resource, such as an SRS resource indication (SRI), a tracking reference signal resource indication (TRI), a synchronization signal block (SS block) indication, a CSI-RS indication (CRI), or beam resource information indicated by the QCL relationship of the above beam resource information, or a transmitted precoding matrix indicator (TPMI).
2) The base station indicates the association relationship between one of the SRS resource set or the SRS resource and the beam resource indication information in the MAC CE.

The association relationship may be configuring the beam resource indication information for each activated SRS resource set.

3) The base station indicates the association relationship between one of the SRS resource set or the SRS resource and the beam resource indication information in the physical layer information, such as downlink control information (DCI). The association relationship may be configuring the beam resource indication information for a triggered SRS resource set.

The UE receives the configuration information of the SRS resource set and the power control parameter configuration information of the PUSCH, receives related MAC CE information and physical layer information, and acquires the association relationship between one of the SRS resource set or the SRS resource and the beam resource indication information.

Part or all of power control parameters in the SRS resource set are replaced with the power control parameters of the PUSCH when one of following conditions or a combination of multiple conditions is satisfied.

1) The application scenario is a non-beam scenario.
2) The SRS resource set is configured as aperiodic.
3) The SRS resource set is configured as semi-static.
4) The number of SRS resources in the SRS resource set is equal to 1.
5) The number of repetitions of SRS resources in the SRS resource set is equal to 1.
6) An antenna resource associated with the SRS resource set or the SRS resource matches with an antenna resource associated with the PUSCH; the antenna resource refers to a resource of a physical or virtual antenna, such as an antenna port, an antenna panel, an antenna port group, and so on.
7) The beam resource indication information associated with the SRS resource set or the SRS resource is same as or matches with part or all of the beam resource indication information associated with the power control parameter of the PUSCH; where
    matching refers to that beam resources are indicated by a same resource number, or the beam resources satisfy a specific QCL relationship.
    When the number of beam resources associated with the SRS resource set or the SRS resource is greater than 1, matching refers to that all of beam resources associated with the SRS resource set or the SRS resource and beam resources associated with the power control parameter of the PUSCH satisfy the specific QCL relationship; and
    the beam resource indication information associated with the power control parameters of the PUSCH may be a transmitting resource of a demodulation reference signal (DMRS) of the PUSCH, such as an antenna port, a transmitting beam, an SRI, and etc.
8) A grant type of the SRS resource set or SRS resource is same as of a grant type of the power control parameter of the PUSCH; where
    the grant type refers to the grant-based type or the grant-free type.
9) Beam resource information transmitted by the SRS resource in the SRS resource set is indicated by the base station, or the beam resource indication information transmitted by the SRS resource in the SRS resource set is not transparent to the base station.

Where, the beam resource information transmitted by the SRS resource in the SRS resource set is indicated by the base station means that the base station configures the transmitting beam resource of the SRS resource through the RRC signaling, or configures or indicates the transmitting beam resource of the SRS resource through the MAC CE or the physical layer signaling, such as DCI.

The transmitting beam resource may be one of: an SS block resource indication, an SRS indication (SRI), a TRS resource indication (TRI), or a CSI-RS resource indication (CRI).

The transmitting beam resource references one or more transmissions before the base station indicates it to the SRS resource. For example, the transmitting beam resource references a transmission of the SS block, and its process is as follows.

The base station periodically transmits M SS blocks, which sequentially are numbered as m from 0 to M−1. Assuming that the UE needs to train N beams, then the UE first uses a same receiving beam to measure the M SS blocks in one period to obtain RSRP of each of M SS blocks, uses different receiving beams in subsequent SS block periods to measure and obtain RSRP of different beam pairs from other base stations to the UE, and calculates PLs of these beam pairs. After comparison, the UE feeds back a beam pair with a smaller PL to the base station, and the base station may indicate beam resources to subsequent scheduling according to these information.

It is assuming that the base station indicates an SS block of m=1 in the SS blocks to a certain SRS as reference information of the transmitting beam, and the UE has previously received an SS block of a beam with m=1 at least N times, the UE chooses the receiving beam corresponding to an SS block transmission with the best receiving performance (for example, with the maximum RSRP, or the minimum PL) as the transmitting beam of the SRS.

In addition, the transmitting beam resource references a transmission of the resource indication of the SRS, and its process is as follows.

The base station configures the SRS resource set for the UE, where the SRS resource set is assumed to be identified by an SRS resource set ID of 1, and configures with multiple SRS resources which are assumed to be identified by SRS resource IDs of 1 to x respectively, and the base station does not designate a transmitting beam resource for the UE, that is, the transmitting beam of the SRS is transparent to the base station. In this case, the UE needs to determine the beam resource to be transmitted by itself. Generally speaking, the beam scan with a large range is required for the UE, so it is not strongly necessary to share the power control parameter of the PUSCH. This process may be used for the uplink beam management, or the uplink beam scan. After the UE transmits the SRS, the base station performs the measurement and indicates the beam resource to subsequent transmissions based on these measurement results.

After the above-mentioned SRS resource set, the base station indicates that the transmitting beam of a certain SRS is the SRS resource ID of 1 in the SRS resource set ID of 1 in the manner that the transmitting beam is non-transparent to the base station.

As the indication information of the SRS resource, the SRI may indicate one of: SRS resource set indication information or indication information of the SRS resource inside the SRS resource set; only identification information of the SRS resource exists in a case that all SRS resources in all SRS resource sets of the UE are uniformly identified.

Whether the above conditions go into effect may also be configured by the base station: the base station configures a parameter which determines whether to allow the SRS to share the power control process of the PUSCH for each SRS resource set.

When the SRS is not allowed to share the power control process of the PUSCH, the power control parameter configured in the SRS resource set is used to calculate the transmitting power.

When the SRS is allowed to share the power control process of the PUSCH, the UE determines whether to share the power control process of the PUSCH according to results of one of following conditions or results of a combination of multiple conditions.

When the above condition is satisfied, the manner of determining the power control parameter is one of followings.

1) All of power control parameters of the PUSCH associated with beam resource indication information which is associated with the SRS resource set or the SRS resource are used to calculate the transmitting power for the SRS resource set.
2) Part of power control parameters of the PUSCH associated with the beam resource indication information which is associated with the SRS resource set or the SRS resource are used to calculate the transmitting power for the SRS resource set.
3) All of power control parameters of the PUSCH associated with the grant type which is associated with the SRS resource set or the SRS resource are used to calculate the transmitting power for the SRS resource set.
4) Part of power control parameters of the PUSCH associated with the grant type which is associated with the SRS resource set or the SRS resource are used to calculate the transmitting power for the SRS resource set.

That is, part or all of power control parameters of the PUSCH are respectively used for indicating part or all of the following power control parameters of the PUSCH to replace corresponding configuration parameters of the SRS:

1) alternative relationship 1: using a sum of P0_PUSCH and P0_SRS_OFFSET to replace P0_SRS;
2) alternative relationship 2: using Alpha_PUSCH to replace Alpha SRS;
3) alternative relationship 3: using an RS resource indication of a PL estimation configured for the PUSCH to replace an RS resource indication of a PL estimation configured for the SRS; and
4) alternative relationship 4: using a closed-loop power adjustment amount configured for the SRS to replace a closed-loop power adjustment amount configured for the PUSCH.

In some embodiments, part or all of power control parameters of the PUSCH are configured by the base station or are pre-defined.

Pre-defined refers to supporting one or more of the above alternative relationships.

Configured by the base station refers to that the base station configures one or more of the above alternative relationships for the UE. For example, a manner of bitmap is supported, and 4-bit information is respectively used for indicating whether the alternative relationships 1 to 4 are effective. Alternatively, several alternative subsets are pre-defined, such as four subsets, where subset 1 is that the alternative relationships 1 to 4 are configured to be effective, subset 2 is that only alternative relationships 3 and 4 in the above alternative relationships are effective, subset 3 is that only alternative relationship 4 in the above alternative relationships is effective, and subset 4 is that none of the above alternative relationships is effective, that is, it is not supported to replace the parameters of the SRS with the parameters of the PUSCH.

The following is an example of the above process supporting different SRS types.

The base station configures a parameter which does not allow the SRS to share the power control process of the PUSCH for an SRS for DL CSI acquisition and an SRS for the antenna switching of the SRS resource set, and configures a parameter which allows the SRS to share the power control process of the PUSCH for the SRS for the UL CSI acquisition and the SRS for the beam management of the SRS resource set. In a scenario using beams, the UE may determine whether the SRS for the UL CSI acquisition and the SRS for the beam management share the power control process of the PUSCH through a beam relationship; in a non-beam scenario, the power control parameter of the PUSCH shared by the SRS for beam management and the SRS for the UL CSI acquisition does not exist.

This embodiment provides an enhancing solution for multiple downlink (DL) reference signals (RSs) for the pathloss (PL) measurement.

The base station configures K pathloss measurement parameters for the UE, and each pathloss measurement parameter includes at least one of: indication information of a downlink reference signal (DL RS) resource, or a rule for processing multiple PL values.

The indication information of the DL RS resource includes one of: a type of the DL RS, or a resource indication of the DL RS.

The base station configures an indication of a beam resource in the DL RS resource, and the UE measures the PL using only the DL RS of the beam resource.

The base station configures an indication of a beam resource in the DL RS resource, and the UE obtains a set of DL RSs that has a QCL relationship configured by the base station with the beam resource to measure the PL.

The base station configures an indication of a beam resource in the DL RS resource, and indicates the UE to obtain a set of DL RSs that has the QCL relationship configured by the base station with the beam resource to measure the PL.

The base station does not configure a DL RS resource for the PL calculation, or configures a reserved value in the DL RS resource, and in this case, the UE decides by itself a DL RS used for measuring and calculating the PL, or uses a DL RS associated with the downlink channel to calculate the PL assuming that the reciprocity between the uplink and the downlink exists.

The base station configures more than one beam resource indication in the DL RS resource, these beam resource indications are beam resource indications of a same type, and in a specific scenario, these beam resource indications of the same type satisfy the specific QCL relationship. The base station configures more than one beam resource indication in the DL RS resource, these beam resource indications include beam resource indications of different types, and in a specific scenario, these beam resource indications of different types satisfy the specific QCL relationship.

The beam resource indication refers to at least one of pieces of information used for indicating the downlink transmitting beam of the base station: a CRI(s), an SS-block resource indication, and a TRS resource indication. The CRI refers to a CSI-RS resource indication, and this information is used for indicating the UE to perform the PL measurement by using a designated CSI-RS. The SS-block resource indication refers to a resource indication of a secondary synchronization signal (SSS) in an NR synchronization signal (SS) or a demodulation reference signal (DMRS) of a primary broadcast channel (PBCH), and this information indicates the UE to perform the PL measurement by using a designated SS-block. The TRS is a tracking reference signal, and the TRS resource indication indicates the UE to perform the PL measurement by using a designated TRS.

The specific scenario includes: when a power control parameter is configured for the PUSCH in the beam scenario, when a power control parameter is configured for the PUCCH in the beam scenario, or when a power control parameter is configured for the SRS in the beam scenario for acquiring downlink or uplink CSI.

The rule for processing multiple PL values is a rule for processing multiple PLs measured by DL RSs transmitted by multiple configured DL RS resources to obtain a PL value. This rule includes followings.

Multiple PLs satisfying a predetermined condition are sorted, and a weighted average is performed according to predetermined weights. The predetermined condition includes that a PL is less than a configured threshold. The base station configures the predetermined weights.

This embodiment provides a solution of maintaining consistent power of the SRS resource set and consistent power in multiple periods.

The SRS resource set includes at least one SRS resource, and the transmitting power of multiple SRS resources in a same SRS resource set is consistent.

For a periodic SRS resource set, the base station configures a period, and the UE periodically uses the SRS resources in the SRS resource set to transmit the SRS.

The transmitting power of each of SRSs transmitted by occupying SRS resources in a same SRS resource set in one period is maintained consistent.

For a periodic SRS resource set, the base station configures a number of periods maintaining same transmitting power, and the transmitting power of each of SRSs transmitted by occupying SRS resources of the SRS resource set in the number of periods is maintained consistent.

For an aperiodic SRS resource set, an SRS triggering is performed by physical layer signaling, and the transmitting power of each of SRSs occupying multiple SRS resources indicated in the SRS resource set in a same triggering is maintained consistent.

The SRS triggering may indicate the SRS resources in the SRS resource set once, or indicate the SRS resources in the SRS resource set repeatedly for multiple times. The transmitting power of each of SRSs occupying multiple SRS resources indicated in the SRS resource set in the same triggering is maintained consistent.

For a semi-static SRS resource set, in an activated state, it is similar to the periodic SRS resource set, the base station configures a period, and the UE periodically uses the SRS resources in the SRS resource set to transmit the SRS.

The transmitting power of each of SRSs transmitted by occupying SRS resources in a same SRS resource set in one period is maintained consistent.

For the semi-static SRS resource set, the base station configures the number of periods maintaining the same transmitting power, and the transmitting power of each of SRSs transmitted by occupying SRS resources in the SRS resource set in the number of periods is maintained consistent.

This embodiment provides an influence of the number of repetitions of transmitting the SRS on the transmitting power of the SRS.

The repetitions of transmitting the SRS in time domain may enhance receiving quality and improve the coverage.

The repetitions of transmitting the SRS in frequency domain may achieve another propose of reducing the transmitting power, thereby reducing interferences to other communication nodes.

The base station reflects the influence of the number of repetitions of SRS transmissions on the transmitting power of the SRS in at least one of following manners.

1) A transmitting power parameter is adjusted by using an SRS time domain repetition factor.

For example, a total number of repetitions of transmitting the SRS is used as a coefficient of the power calculation. The following formula is an implementation manner. In this formula, $R_{SRS,c}(i)$ is the total number of repetitions of transmitting the SRS, and for example, if the transmission is performed once, then retransmission is performed once, that is, twice, and this value is 2. For other parameters, references are made to the description of embodiment 2.

$$P_{SRS,c}(i) = \min\left\{\begin{array}{l} P_{CMAX,c}(i), \\ 10\log_{10}(1/R_{SRS,c}(i)) + P_{0\_SRS,c}(j) + \alpha_{SRS,c}(j) * PL_{SRS,c}(k) + h_c(i, l) \end{array}\right\}$$

The base station configures an influence coefficient of an SRS time domain repetition factor on the transmitting power.

For example, the base station selects one from a preconfigured influence coefficient table for the UE. It is assumed that the influence coefficient table includes 0, 1 and values in the range of 0 to 1, such as $R_{SRS,c} \in \{0, 0.5, 1\}$ herein 0 is equivalent to that this function is not enabled, and 1 is equivalent to that this function is completely enabled, for example, the transmission is repeated twice, the transmitting power of the SRS is reduced by 3 dB compared to the transmitting power when the function is not enabled. Values in the range of 0 to 1 represent that the influence coefficient is in a partially enabled state.

The following formula is an implementation manner, where $\beta_{SRC,c}$ is the influence coefficient.

For other parameters, references are made to the above description.

$$P_{SRS,c}(i) = \min\left\{\begin{array}{l} P_{CMAX,c}(i), \\ \beta_{SRS,c} * 10\log_{10}(1/R_{SRS,c}(i)) + P_{0\_SRS,c}(j) + \\ \alpha_{SRS,c}(j) * PL_{SRS,c}(k) + h_c(i, l) \end{array}\right\}$$

3) Whether to enable the function of influencing the transmitting power by the SRS time domain repetition factor is controlled by using a switch.

If the function is enabled, the transmitting power calculated for the SRS is adjusted according to a ratio of the SRS time domain repetition factor. For example, if the transmission is repeated twice in the time domain, the transmitting power of the SRS is reduced by 3 dB compared to the transmitting power when the function is not enabled.

For example, the value of $\beta_{SRC,c}$ in the above formula is configured as 0 or 1 by the switch.

The following provides an embodiment for a relationship between the power control parameter of the PUCCH and a PUSCH/physical downlink shared channel (PDSCH).

A beam resource of the PUCCH may be different from a beam resource of the PUSCH. A scheduling duration of the PUCCH is generally longer, and resource configuration information, such as transmitting beam resource information, may be updated through RRC signaling. The PUSCH may have a more flexible scheduling mechanism, and resource configuration information, such as the transmitting beam resource information, may be indicated through the RRC signaling, an MAC CE, or physical layer signaling. In some scenarios, the PUCCH temporarily uses the transmitting beam resource information and/or power control mechanism of the PUSCH, which would bring benefits.

The base station configures the power control parameters of the PUCCH for the UE, and configures and/or schedules resources for the PUCCH. The UE may determine the power control parameter according to transmitted PUCCH resources, including the open-loop power control parameter, the pathloss calculation parameter and the closed-loop power control parameter, and calculates the transmitting power of the PUCCH.

The base station configures the power control parameters of the PUSCH for the UE, configures and/or schedules resources for the PUSCH. The UE may determine the power control parameter according to transmitted PUSCH resources, including the open-loop power control parameter, the pathloss calculation parameter and the closed-loop power control parameter, and calculates the transmitting power of the PUSCH.

The PUCCH may temporarily use at least one of the power control parameter of the PUSCH or the transmitting beam resource of the PUSCH when at least one of following conditions is satisfied.
1) The PUSCH and the PUCCH are in a same slot.
2) The PUSCH and the PUCCH are frequency-divided.
3) The transmitting beam of the PUCCH is the same as the transmitting beam of the PUSCH.
4) The transmitting beam of the PUCCH and the transmitting beam of the PUSCH satisfy the specific QCL relationship.

Temporarily using the power control adjustment parameter and the transmitting beam resources of the PUSCH by the PUCCH is valid only for a current PUCCH transmission. This PUCCH transmission does not affect transmitting beam resources and power control parameters of other PUCCHs.

When the PUCCH temporarily uses the power control parameter of the PUSCH, its closed-loop power control parameter uses the closed-loop power control parameter of the PUSCH, i.e., the closed-loop power adjustment amount of the PUSCH, which is updated by the closed-loop power process of the PUSCH. The PUCCH temporarily uses this amount and does not update this amount.

When the PUCCH temporarily uses the power control parameter of the PUSCH, the target receiving power P0 of its open-loop power control parameter is determined by a sum of the target receiving power P0 of the PUSCH and the target receiving power offset value of the PUCCH. The target receiving power offset of the PUCCH is an offset of the PUCCH configured by the base station relative to the target receiving power of the PUSCH.

For example, the following formula is an implementation manner.

$$P_{PUCCH,c}(i) = \min\begin{cases} P_{CMAX,c}(i), \\ P_{PUCCH\_OFFSET,c}(F) + P_{0\_PUSCH,c}(j) + \alpha_c(j) \cdot PL_c + f_c(i, l) \end{cases}$$

In the above formula, i is a time unit number, such as a subframe number, a slot number, and a number of an OFDM symbol; j is a number of a PUSCH open-loop power control parameter set, and F is a format number of the PUCCH; l is a number of a PUSCH closed-loop power control parameter set, which also refers to a closed-loop power control process identification of the PUSCH, or a closed-loop power control loop identification; $P_{0\_PUSCH,c}(j)$, $\alpha_c(j)$, $PL_c$, $f_c(i,l)$ are respectively the target receiving power, the pathloss compensation factor, the pathloss calculation parameter, the closed-loop power control adjustment amount of the PUSCH.

The base station configures the power control parameter of the PUSCH for the UE, including at least one set of open-loop power control parameters (at least including the target receiving power P0 and the pathloss factor alpha), at least one set of pathloss measurement parameters (an RS resource configuration for the PL calculation) and at least one set of closed-loop power control processes, which are respectively indicated by the open-loop power control parameter identifications, the pathloss measurement parameter identifications and the closed-loop power control process identifications.

The base station further configures at least one of following associations for the UE:
1) an association between the open-loop power control parameter and a reference signal index;
2) an association between the pathloss measurement parameter and the reference signal index;
3) an association between the closed-loop power control process and the reference signal index;
4) an association between the open-loop power control parameter and the PL measurement parameter;
5) an association between the open-loop power control parameter and the closed-loop power control process;
6) an association between the pathloss measurement parameter and the closed-loop power control process; and
7) an association between the open-loop power control parameter/pathloss measurement parameter and the closed-loop power control process.

The base station may indicate the UE to obtain the power control parameters of the PUSCH by configuring at least one of: the reference signal index, the open-loop power control parameter identification, the pathloss measurement parameter identification, and the closed-loop power control process identification.

The closed-loop power control process identification determines the closed-loop power control process, also called a closed-loop power control loop. The UE maintains a local power adjustment f(i, 1) for each closed-loop power control process (assuming that the closed-loop power control process identification is 1).

The closed-loop power adjustment parameter f(i, 1) is reset when the target receiving power P0 and/or pathloss factor alpha in the open-loop power control parameter are/is configured or reconfigured. One of following cases is included.
1) When the open-loop power control parameter sets of the PUSCH are configured or reconfigured, f(i, 1)s corresponding to all closed-loop power control process identifications are reset.
2) When part of the open-loop power control parameter sets of the PUSCH are configured or reconfigured, only f(i, 1)s corresponding to closed-loop power control process identifications associated with indexes of the configured or reconfigured open-loop power control parameter sets of the PUSCH are reset.

3) When some parameters in the open-loop power control parameter sets of the PUSCH, such as P0 and/or alpha, are configured or reconfigured, only f(i, 1)s corresponding to closed-loop power control process identifications associated with indexes of the configured or reconfigured open-loop power control parameter sets are reset.

The above contents are also applicable to the power control parameters of the PUCCH and the power control parameters of the SRS.

The base station may be configured to reset or inherit the closed-loop power control process. Configuration signaling may be the RRC signaling, the MAC CE, or the physical layer (PHY) signaling.

The base station may be configured to inherit the closed-loop power control process between different channels and signals. Configuration signaling may be the RRC signaling, the MAC CE, or the PHY signaling.

The present application can determine a unified power control formula and configuration architecture for different requirements of an SRS-CSI for the PUSCH, an SRS-CSI for the PDSCH and SRS-BM U1/U2/U3:

1) explicitly or implicitly (for example, through characteristics of the SRS resource, especially a binding relationship with beams) indicating whether the SRS and the PUSCH share the power control parameter P0/alpha/PL and whether the SRS and the PUSCH share f(i), where f(i) denotes a power control correction function of a subframe i;

2) since an independent configuration of the power control parameters of the SRS requires for establishing associations of multiple Js, Ks and Ls of the SRS, which is convenient for a dynamic indication of the SRS, which is implemented by configuring associations between the beam (group) and j, k, l, or configuring associations among j, k and l; and 3) implicitly and explicitly determining a manner for the SRS to use the power control parameters of the PUSCH when the power control parameters of the PUSCH is shared.

Alternative embodiment y: (a configuration parameter for antenna switching control and/or beam management control)

In this embodiment, there is a configuration parameter in the configuration of one SRS resource set, and this configuration parameter has at least two states: an antenna switching state and a beam switching state. Alternatively, this configuration parameter is a configuration parameter jointly coded by information of the antenna switching and information of the beam management. Alternatively, the configuration parameter is a configuration parameter shared by the information of the antenna switching and the information of the beam management, that is, this configuration parameter is used for the antenna switching control or the beam management control.

For example, this configuration parameter is X. When X is 0, it indicates that different SRS resources in this SRS resource set are used for the antenna switching, and different SRS resources in this set correspond to different antennas or different SRS resources in this set correspond to different antenna groups. When X is 1, it indicates that different SRS resources in this SRS resource set are for beam switching, and different SRS resources represent different beams.

In some embodiments, this configuration parameter may have at least two of following state bits: antenna switching, beam switching with a same antenna, beam switching with different antennas, and beam invariability with a same antenna.

In some embodiments, the configuration parameter may have at least two of following state bits: antenna switching with a same beam, antenna switching with different beams, beam switching with a same antenna, beam switching with different antennas, and beam invariability with a same antenna.

In some embodiments, this configuration parameter may also include at least two of states: 1T2R, 2T4R, 1-port transmitting with beam switching, 1-port transmitting with beam invariability, 2-port transmitting with beam switching, 2-port transmitting with beam invariability, and 4-port. Herein, "1T2R" represents that current two SRS resources correspond to different transmitting antennas, and each SRS resource includes an SRS port, "2T4R" represents that current two SRS resources correspond to different transmitting antennas, and each SRS resource includes two SRS ports. "1-port transmitting with beam switching" represents that different SRS resources are used for scanning transmitting beams, and each SRS resource includes one port. "1-port transmitting with beam switching" represents different SRS resources for scanning transmitting beams, and each SRS resource includes one port. "2-port transmitting with beam switching" represents that different SRS resources are used for scanning transmitting beams, and each SRS resource includes two ports. "2-port transmitting with beam switching" represents transmitting beam scan for different SRS resources, and each SRS resource includes two ports. "4-port" represents that this SRS includes 4 ports.

The "antenna switching" represents that different SRS resources in this SRS resource set represent different antennas, "beam switching with a same antenna" represents that different SRS resources in this SRS resource set represent different beams transmitted by the same antenna, and "beam switching with different antennas" represents that different SRS resources in this SRS resource set represent different beams transmitted by different antennas (different beams may have a same radio frequency (RF) weighting factor, which are beams transmitted by different antennas, or different beams may have different RF weighting factors, and different beams transmitted by different antennas are called different beams. The RF weighting factor may also be referred to as a spatial filter, or a spatial filter factor).

Figure 6:
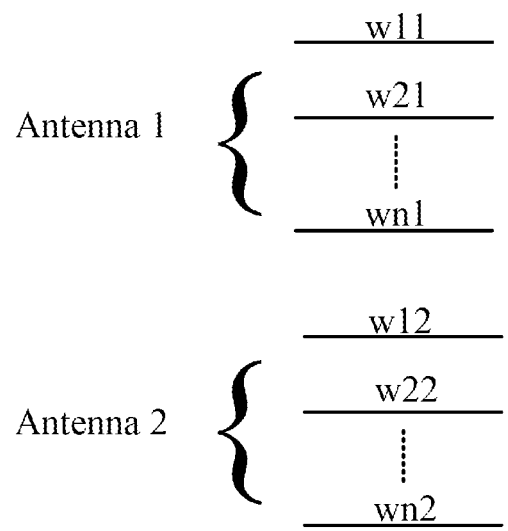
FIG. 6 is a schematic diagram of antenna radio frequency weighting factors according to an embodiment of the present application.

There is a detail that needs to be further elaborated. As shown in FIG. 6, antenna 1 corresponds to n elements (that is, a signal transmitted by antenna 1 needs to be transmitted from n elements associated with antenna 1 after weighting through [w11, w21, . . . , wn1], so as to form a radio frequency beam), and antenna 2 corresponds to n elements. Weighting factors on the elements in antenna 1 are w1= [w11, w21, . . . wn1], and w2=[w12, w22, . . . , wn2]. When w1 is equal to w2, SRS resource 1 is transmitted by antenna 1, and SRS resource 2 is transmitted by antenna 2, which in an implementation manner of this embodiment may be called that SRS resource 1 and SRS resource 2 have a same spatial filter parameter, or SRS resource 1 and SRS resource 2 correspond to a same transmitting beam with different antennas, or in another implementation manner of this embodiment, which may also be called that SRS resource 1 and SRS resource 2 have different spatial filter parameters, or SRS resource 1 and SRS resource 2 correspond to different transmitting beams with different transmit antennas.

The "beam invariability with a same antenna" represents that the different SRS resources in this SRS resource set are repeatedly transmitted by a same beam and a same antenna.

The "antenna switching with a same beam" represents that different SRS resources correspond to different antennas or antenna groups, and further correspond to a same radio frequency weighting factor (or a spatial filter factor). As shown in FIG. 6, SRS resource 1 and SRS resource 2 correspond to different antennas, but radio frequency weighting factor w1 is equal to w2. The "antenna switching with different beams" represents that SRS resource 1 and SRS resource 2 correspond to different antennas, and the radio frequency weighting factors w1 and w2 are different.

In the above description, the configuration parameter X is configured in the SRS resource set, and this embodiment does not rule out the case that the above configuration parameter X is configured in the SRS resource.

In this embodiment, the transmitting beam may also be referred to as a spatial filter parameter.

Alternative embodiment y+1:

In this embodiment, a parameter Y exists in the configuration of one SRS resource set, where the parameter Y is an antenna switching configuration parameter, or the parameter Y is a configuration parameter jointly encoded by antenna switching and beam management, or the parameter Y is a configuration parameter shared by antenna switching and beam management.

In some embodiments, a configurable range of the parameter Y or whether the parameter Y exists is determined according to at least one of following parameters: a multiplexing mode between SRS resources, a number of SRS resources included in this SRS resource set, a number of ports included in each SRS resource in the SRS resource set, or the minimum time interval between different SRS resources in the SRS resource set.

Alternatively, the parameter Y is jointly encoded with at least one of the following parameters: the multiplexing mode between SRS resources, the number of SRS resources included in this SRS resource set, the number of ports included in each SRS resource in the SRS resource set, or the minimum time interval between different SRS resources in the SRS resource set.

In some embodiments, when a frequency division multiplexing (FDM) exists in the multiplexing mode between SRS resources, Y cannot be configured as an antenna switching mode, that is, different SRS resources in the SRS resource set cannot be used for switching different antennas.

In some embodiments, when the number of SRS resources included in the SRS resource set belongs to a predetermined set (e.g., the predetermined set is {2,4}, or the predetermined set is {2}), the configurable range of Y is range 1, and when the number of the SRS resources included in the SRS resource set does not belong to the predetermined set (e.g., the predetermined set is {2, 4}, or the predetermined set is {2}), the configurable range of Y is 2, where optionally, range 2 is a subset of range 1. For example, range 1 is {0-4}, range 2 is {1-4}.

The configurable range is a value, but this embodiment does not rule out the case that the configurable range is a set consisting of state bits.

In some embodiments, when the number of ports included in each SRS resource in the SRS resource set belongs to a predetermined set (e.g., the predetermined set is {1}, or the predetermined set is {1, 2}), the configurable range of Y is range 3, otherwise the configurable range of Y is range 4, where optionally, rang 4 is a subset of range 3. For example, range 3 is {0-5}, range 4 is {2-5}. The configurable range is a value, but this embodiment does not rule out the case that the configurable range is a set consisting of state bits.

In some embodiments, when the minimum time interval between different SRS resources in the SRS resource set is greater than a predetermined threshold, the configurable range of Y is range 5, otherwise, the configurable range of Y is range 6, where optionally, range 6 is a subset of range 5. For example, range 5 is {0-5}, range 6 is {2-5}. The configurable range is a value, but this embodiment does not rule out the case that the configurable range is a set consisting of state bits.

Simplified characteristics:

In a same carrier, a power adjustment is performed on a channel to be transmitted and/or signal to be transmitted symbol-by-symbol to satisfy:
  a maximum power limit of the carrier; and
  channels or signals of a same type among multiple symbols within a same slot maintain same non-zero power or a same non-zero power spectral density.

In multiple carriers, a power adjustment is performed on a channel to be transmitted and/or signal to be transmitted symbol-by-symbol to satisfy:
  a maximum power limit of multiple carriers; and
  channels and/or signals of a same type among multiple symbols within a same slot in a same carrier maintain same non-zero power or a same non-zero power spectral density.

When multiple carriers perform an uplink transmission simultaneously, the process of determining the transmitting power has at least one of following characteristics:
  1. power of all transmissions on each carrier is calculated, and denoted by Pc,x,ch, where c is a number of a CC, x is a number of an OFDM symbol in the slot, and ch is a channel or a signal, which may be a PUSCH, a long PUCCH (L-PUCCH), a short PUCCH (S-PUCCH), an SRS, and etc.;
  2. it is determined symbol by symbol on each carrier whether the sum of power required for all transmissions on this symbol in a carrier exceeds the maximum power limit allowed by the carrier; and
  3. for a symbol exceeding the maximum permissible power limit, the transmitting power of all transmissions on a symbol in the carrier is processed within the carrier according to a predefined rule, denoted as P'c,x,ch.

The predefined rule includes: it is ensured that a transmission with a higher priority is a given priority to obtain power according to a channel priority and a signal a priority, for example, the priority of the PUCCH is higher than the priority of the PUSCH, the priority of the PUSCH is higher than the priority of the SRS, the priority of the PUSCH including uplink control information (UCI) is higher than the priority of the PUSCH including no UCI, and PUSCHs are compared according to a service priority of a transmission, for example, the priority of the PUSCH including an ultra-reliable and low latency communications (URLLC) service is higher than the priority of the PUSCH including an enhanced mobile broadband (eMBB) service and etc. Remaining power is allocated in transmissions with a lower priority. If there are multiple transmissions with an equal priority, power of multiple transmissions is reduced in a same proportion, or some transmissions are not allocated with power, that is, the corresponding P'c,x,ch is zero.

In the carrier, transmissions of a same type among multiple symbols maintain same power within one slot. If power on some symbols is zero, the power may not be consistent to power of other symbols. The method includes one of: taking a minimum value of power P'c,x,ch of transmissions of all symbols with a same type; and taking a minimum non-zero value of P'c,x,ch of transmissions of all symbols a same type.

When slots of all carriers have a same length, whether the sum of power of all transmissions of all carriers on a symbol exceeds the maximum power limit allowed by the UE is determined symbol by symbol on all carriers.

The sum of power is obtained by fixing the value of x in P'c,x,ch as the number of a currently determined symbol, and traversing and summing terms of c and ch in P'c,x,ch.

For a symbol exceeding the allowed maximum power limit, the transmitting power of all transmissions on this symbol is processed according to a predefined rule, and the transmitting power is denoted as P"c,x,ch.

The predefined rule includes: it is ensured that the transmission with a higher priority is given priority to obtain power according to the channel priority and the signal priority, and remaining power is allocated among rest transmissions with a lower priority. If there are multiple transmissions with an equal priority, power of the multiple transmissions is reduced in a same proportion, or some transmissions are not allocated with power, that is, the corresponding P"c,x,ch is zero.

Within a slot, transmissions with a same type among multiple symbols maintain same power in each carrier. If power on some symbols is zero, power of other symbols may not be consistent.

The method includes one of: taking the minimum value of the transmitting power P"c,x,ch of transmissions of all symbols with a same type; or taking the minimum non-zero value of the transmitting power P"c,x,ch of transmissions of all symbols with a same type.

When multiple carriers have different slot lengths, the multiple carriers are grouped according to slot lengths, a guaranteed power is set for each carrier group, and the multi-carrier transmitting power processing of the above characteristics 1 to 7 is performed independently on each carrier group. Whether power between carrier groups may be shared and a sharing method are configured by the base station or determined according to a predefined rule.

The method for the base station to configure or the predefined rule includes followings.

In configuration one, power allocation cannot be shared among multiple carrier groups, that is, the guaranteed power part of multiple groups cannot be occupied by other groups, and remaining power except the guaranteed power of multiple groups may be occupied by a first start transmission, or may be occupied by a transmission with an earlier determined transmitting moment; and In configuration two, if it may be predicted that some groups are not transmitted within the time range of a current transmission, the guaranteed power of carrier groups that are not transmitted may be shared by other groups, for example, when power of a short slot carrier group is calculated, if a long slot carrier has no transmission, the guaranteed power set in a remaining time of the long slot carrier group may at least be occupied; if it is not possible to predict whether there is a transmission within the time range of the current transmission, the guaranteed power must be reserved.

For double-connected two CGs, i.e., a master cell group and a secondary cell group, the guaranteed power is set for each CG, and how to share power of multiple carriers between CGs is configured by the base station or determined according to the predefined rule.

The method for the base station to configure or the predefined rule includes followings.

In configuration one, a power allocation may be shared between the two CGs, and a priority of the power allocation is determined according to the channel priority and a transmission priority.

In configuration one, the power allocation cannot be shared between the two CGs, that is, the guaranteed power part of each CG cannot be occupied by the other group.

In configuration two, if it may be predicted that other CG is not transmitted within the time range of a current transmission, the guaranteed power of a non-transmission CG may be shared by the other group. If it is not possible to predict whether there is a transmission in the time range of the current transmission, the guaranteed power must be reserved for the other CG The symbol refers to an OFDM symbol.

The carrier may also be one of: a component carrier, or a cell, where the cell includes all types of cells, such as a serving cell, a primary cell, a secondary cell, a primary secondary cell, a PUCCH-SCell, and so on.

The carrier may also be replaced by a band width part (BWP) or a BWP group.

Alternative embodiment z+1 (power control in a case of a carrier aggregation (CA))

Figure 7:
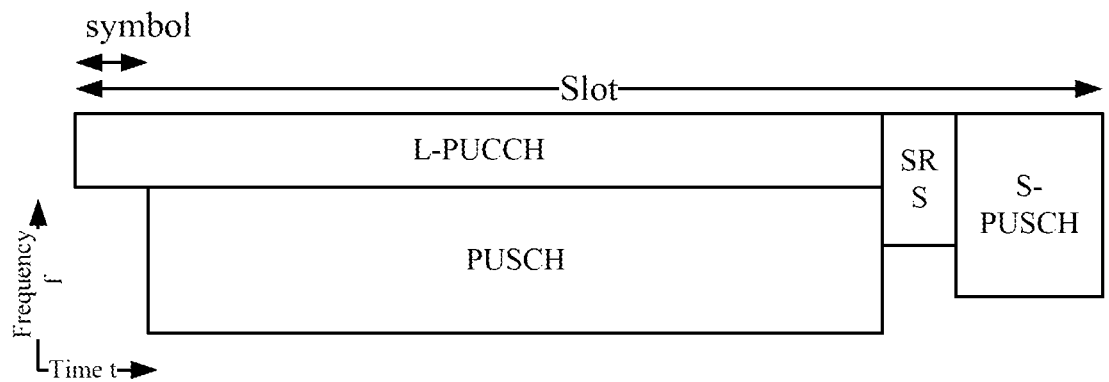
FIG. 7 is a schematic diagram of frequency division multiplexing between a long PUCCH (L-PUCCH) and a PUSCH according to an embodiment of the present application.

Since the NR supports time division and frequency division between different types of channels and signals, such as a long PUCCH (L-PUCCH), a short PUCCH (S-PUCCH), a PUSCH and an SRS, there may be following combinations or subsets thereof:

a time division multiplexing of (a frequency division multiplexing of the L-PUCCH and the PUSCH) and SRS, and the time division multiplexing with the S-PUCCH, as shown in FIG. 7.

Since each channel and positions of a start symbol and an end symbol of the each channel may be different, information to be transmitted and a signal type carried on the symbol may be different in one slot. Therefore, both power control and power headroom report (PHR) need to be calculated symbol by symbol.

In a slot, the calculation is performed symbol by symbol.

In addition, contents carried by channels with a same type may also have different priorities. For example, priorities of an acknowledgement (ACK) and a CQI carried by PUCCHs with a same type may be different. Priorities of an eMBB and a URLLC carried by the PUSCHs are different.

Generally speaking, the transmitting power of channels and services with a higher priority should be guaranteed.

Therefore, even for a relatively simple scenario in the NR CA, such as a synchronous NR CA with a same numerology (a physical frame structure related parameter), the power sharing is more complex than that in LTE because the above-mentioned channel combinations and their respective start and end positions included in each CC may be different.

CA power control in NR should be calculated and compared symbol by symbol, and the power allocation among multiple CCs should be determined according to the priority. When the total power is insufficient, the transmitting power of channels (PUCCH) and services (URLLC) with a higher priority needs to be guaranteed. In a same CC, power of a same channel between different symbols within a slot should be consistent.

The power sharing mechanism of in NR CA is described as follows.

1. Power Pc,x,ch required for each channel on each symbol of each CC of the UE is calculated, and whether each symbol on each CC exceeds Pcmax,c is calculated, that is, whether there is a symbol with insufficient power is checked, where c is the number of the CC, x is the number of an OFDM symbol in the slot, and ch is a channel or a signal, which may be a PUSCH, an L-PUCCH, an S-PUCCH, an SRS, and etc.

Figure 8:
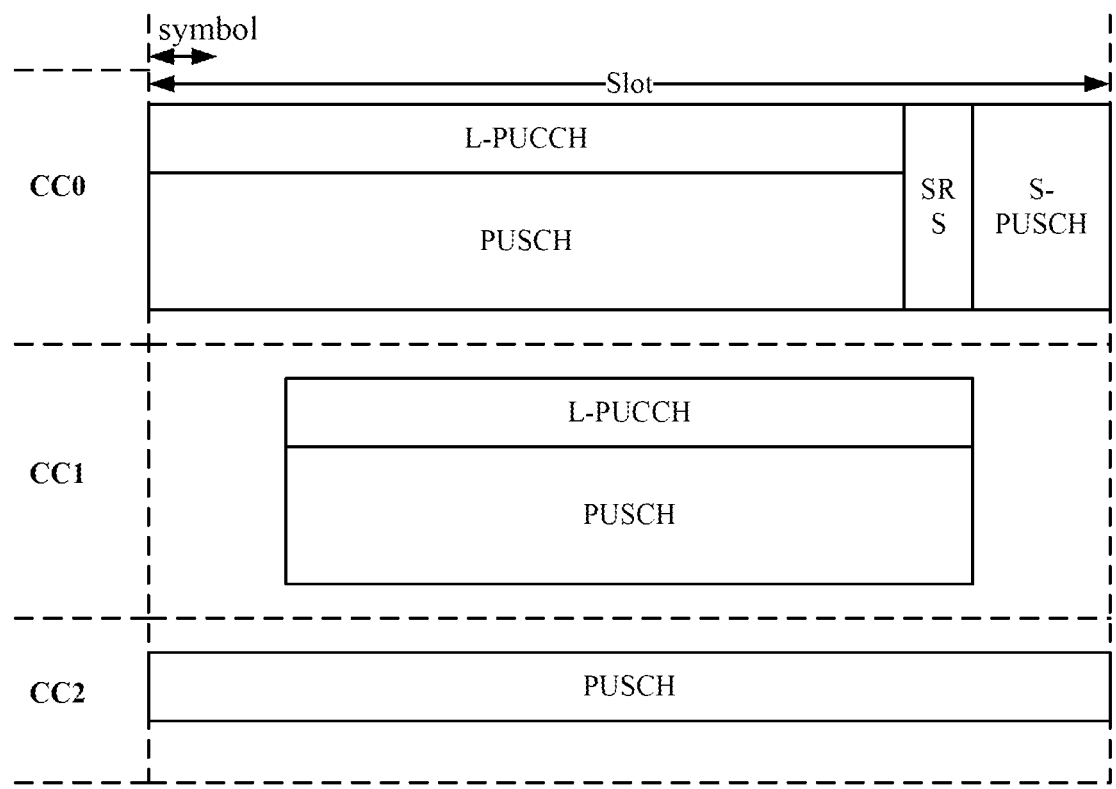
FIG. 8 is a schematic diagram of time-frequency resource allocation on each channel of a symbol in a slot according to an embodiment of the present application.

For example, for the carrier aggregation of three CCs, it is assumed that time-frequency resources allocated to each channel on a symbol within a slot are shown in FIG. 8.

Table 1 shows power required for channels and signals on different symbols within one slot of the three CCs.

TABLE 1

| CC | x = 0 | x = 1 | x = 2 | x = 3 | ... | x = 11 | x = 12 | x = 13 |
|---|---|---|---|---|---|---|---|---|
| CC0 | $P_{0,0,PUSCH}$ $P_{0,0,L-PUCCH}$ | $P_{0,1,PUSCH}$ $P_{0,1,L-PUCCH}$ | $P_{0,2,PUSCH}$ $P_{0,2,L-PUCCH}$ | $P_{0,3,PUSCH}$ $P_{0,3,L-PUCCH}$ | ... | $P_{0,11,SRS}$ | $P_{0,12,S-PUCCH}$ | $P_{0,13,S-PUCCH}$ |
| CC1 | | | $P_{1,2,PUSCH}$ $P_{1,2,L-PUCCH}$ | $P_{1,3,PUSCH}$ $P_{1,3,L-PUCCH}$ | ... | $P_{1,11,PUSCH}$ $P_{1,11,L-PUCCH}$ | | |
| CC2 | $P_{2,0,PUSCH}$ | $P_{2,1x,PUSCH}$ | $P_{2,2,PUSCH}$ | $P_{2,3,PUSCH}$ | ... | $P_{2,11,PUSCH}$ | $P_{2,12,S-PUCCH}$ | $P_{2,13,S-PUCCH}$ |

2. For each CC, if there is a symbol with insufficient power, the power P'c,x,ch required for each channel in the corresponding CC is adjusted according to the priority, such that each symbol in each CC does not exceed their respective Pcmax,c.

It is assumed that the sum of the power of the PUSCH and the power of L-PUCCH of CC0 exceeds Pcmax,CC1, then the PUSCH is adjusted, and an adjusted value is denoted as P', as shown in Table 2.

TABLE 2

| CC | x = 0 | x = 1 | x = 2 | x = 3 | ... | x = 11 | x = 12 | x = 13 |
|---|---|---|---|---|---|---|---|---|
| CC0 | $P'_{0,0,PUSCH}$ $P_{0,0,L-PUCCH}$ | $P'_{0,1,PUSCH}$ $P_{0,1,L-PUCCH}$ | $P'_{0,2,PUSCH}$ $P_{0,2,L-PUCCH}$ | $P'_{0,3,PUSCH}$ $P_{0,3,L-PUCCH}$ | ... | $P_{0,11,SRS}$ | $P_{0,12,S-PUCCH}$ | $P_{0,13,S-PUCCH}$ |
| CC1 | | | $P_{1,2,PUSCH}$ $P_{1,2,L-PUCCH}$ | $P_{1,3,PUSCH}$ $P_{1,3,L-PUCCH}$ | ... | $P_{1,11,PUSCH}$ $P_{1,11,L-PUCCH}$ | | |
| CC2 | $P_{2,0,PUSCH}$ | $P_{2,1x,PUSCH}$ | $P_{2,2,PUSCH}$ | $P_{2,3,PUSCH}$ | ... | $P_{2,11,PUSCH}$ | $P_{2,12,S-PUCCH}$ | $P_{2,13,S-PUCCH}$ |

3. A sum of the transmitting power of channels of all CCs on each symbol is calculated, and compared with Pcmax to check whether the sum exceeds Pcmax, that is, whether a case of a symbol with insufficient power exists in the sum of all CCs is checked. If there is a symbol with insufficient power, symbols of the channels and signals with a high priority in the symbol should be adjusted first, that is, the transmitting power should be set for channels or services with a high priority, and remaining power is allocated to other channels and signals with a relatively low priority.

It is assumed that total power of two symbols x=2 and x=3 exceeds Pcmax,CC1, power of the PUCCH is preferably guaranteed, and power of the PUSCH is further reduced, and denoted as P'', as shown in Table 3.

TABLE 3

| CC | x = 0 | x = 1 | x = 2 | x = 3 | ... x = 11 | x = 12 | x = 13 |
|---|---|---|---|---|---|---|---|
| CC0 | $P'_{0,0,PUSCH}$ $P_{0,0,L-PUCCH}$ | $P'_{0,1,PUSCH}$ $P_{0,1,L-PUCCH}$ | $P''_{0,2,PUSCH}$ $P_{0,2,L-PUCCH}$ | $P''_{0,3,PUSCH}$ $P_{0,3,L-PUCCH}$ | ... $P_{0,11,SRS}$ | $P_{0,12,S-PUCCH}$ | $P_{0,13,S-PUCCH}$ |
| CC1 | | | $P''_{1,2,PUSCH}$ $P_{1,2,L-PUCCH}$ | $P''_{1,3,PUSCH}$ $P_{1,3,L-PUCCH}$ | ... $P_{1,11,PUSCH}$ $P_{1,11,L-PUCCH}$ | | |
| CC2 | $P_{2,0,PUSCH}$ | $P_{2,1x,PUSCH}$ | $P''_{2,2,PUSCH}$ | $P''_{2,3,PUSCH}$ | ... $P_{2,11,PUSCH}$ | $P_{2,12,S-PUCCH}$ | $P_{2,13,S-PUCCH}$ |

4. If there are more than one other channels and signals with a relatively low priority, power is required to be reduced in a same proportion, and power allocated to channels on some CCs may possible be zero.

5. Power of same channels and signals in a same CC maintains consistent on different symbols, as shown in Table 4.

TABLE 4

| CC | x = 0 | x = 1 | x = 2 | x = 3 | ... | x = 11 | x = 12 | x = 13 |
|---|---|---|---|---|---|---|---|---|
| CC0 | $P''_{0,0,PUSCH}$ $P_{0,0,L-PUCCH}$ | $P''_{0,1,PUSCH}$ $P_{0,1,L-PUCCH}$ | $P''_{0,2,PUSCH}$ $P_{0,2,L-PUCCH}$ | $P''_{0,3,PUSCH}$ $P_{0,3,L-PUCCH}$ | ... | $P_{0,11,SRS}$ | $P_{0,12,S-PUCCH}$ | $P_{0,13,S-PUCCH}$ |
| CC1 | | | $P''_{1,2,PUSCH}$ $P_{1,2,L-PUCCH}$ | $P''_{1,3,PUSCH}$ $P_{1,3,L-PUCCH}$ | ... | $P''_{1,11,PUSCH}$ $P_{1,11,L-PUCCH}$ | | |
| CC2 | $P''_{2,0,PUSCH}$ | $P''_{2,1x,PUSCH}$ | $P''_{2,2,PUSCH}$ | $P''_{2,3,PUSCH}$ | ... | $P''_{2,11,PUSCH}$ | $P''_{2,12,S-PUCCH}$ | $P''_{2,13,S-PUCCH}$ |

For a synchronous NR CA with different numerology in NR CA:

When the numerology is different, both the symbol length and the slot length are different. When power of a long slot is calculated, power requirements of a current short slot may be known, but power requirements of a subsequent short slot is unpredictable, so that it is necessary to reserve certain power for subsequent short slots. An extended PCM2 is used, that is, the guaranteed power is configured for each group according to the numerology group.

An embodiment further provides a power control method. The power control method includes steps described below.

When at least part of parameters in open-loop power control parameter set(s) of an uplink transmission are configured or reconfigured, a local closed-loop power adjustment amount corresponding to a closed-loop power control process identification associated with an index of the configured or reconfigured open-loop power control parameter set is reset.

This method may be used for a base station to perform a configuration of the power control parameter on a UE.

When the base station initially configures or reconfigures part or all of open-loop power control parameters in the open-loop power control parameter set of an uplink transmission of the UE, the base station will correspondingly adjust closed-loop power control processes corresponding to these open-loop power control parameters, so as to reset the local closed-loop power control adjustment amount of the UE. To be reset herein may be understood as to be updated.

In some embodiments, the uplink transmission includes at least one of:
a physical uplink shared channel transmission;
a physical uplink control channel transmission; or
an sounding reference signal transmission.

In some other embodiments, parameters of the open-loop power control parameter set of the uplink transmission includes at least one of:
target receiving power; or
a pathloss factor.

In some embodiments, the open-loop power control parameter is indicated by an open-loop power control parameter identification.

The pathloss measurement parameter is indicated by a pathloss measurement parameter identification.

The closed-loop power control process is indicated by a closed-loop power control process identification.

In some embodiments, the method further includes a step described below.

The base station configures at least one of following associations for the user equipment (UE):
an association between the open-loop power control parameter and a reference signal index;
an association between the pathloss measurement parameter and the reference signal index;
an association between the closed-loop power control process and the reference signal index;
an association between the open-loop power control parameter identification and the reference signal index;
an association between the pathloss measurement parameter identification and the reference signal index; or
an association between the closed-loop power control process identification and the reference signal index.

In some embodiments, the method further includes the steps described below.

At least one of followings for the user equipment (UE) to obtain the power control parameters of uplink transmission is transmitted, for example, at least one of followings is transmitted through DCI signaling:
the reference signal index;
the open-loop power control parameter identification;
the pathloss measurement parameter identification;
the closed-loop power control process identification; and
the power control parameter for the UE to obtain uplink transmission.

After the UE receives any one of the above, the UE may determine the power control parameter based on the foregoing associations.

In some embodiments, the UE receives a reference signal identification from the base station, obtains the open-loop power control parameter based on the association between the reference signal identification and the open-loop power control parameter, and then obtains the closed-loop power control parameter based on the association between the reference signal identification and the closed-loop power control process. There is an association relationship between the open-loop power control parameter and the closed-loop power control parameter which are associated with a same reference signal identification.

The closed-loop power control parameter includes the closed-loop power control process identification. An embodiment of the present application further provides a computer storage medium for storing computer-executable codes, where, after being executed, the computer-executable codes are capable of implementing the power control method or the parameter configuration method provided by any one of technical solutions described above.

The computer storage medium may be a non-transitory storage medium.

In the present application, the features of the various embodiments, if not in collision, may be combined with each other. Each embodiment is only an optimal implementation manner of the present application, and is not intended to limit the scope of the present application.

It will be understood by those skilled in the art that all or part of the steps in the methods described above may be implemented by related hardware instructed by programs, and these programs may be stored in a computer-readable storage medium such as a read-only memory (ROM), a magnetic disk or an optical disk. Optionally, all or part of the steps in the embodiments described above may also be implemented by using one or more integrated circuits. Accordingly, the modules/units in the embodiments described above may be implemented by a hardware or a software function module. The present application is not limited to any specific combination of hardware and software.

The above are only alternative embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

We claim:
1. A parameter configuration method, comprising:
configuring, by a base station, a configuration parameter in a configuration of a sounding reference signal (SRS) resource set for a user equipment (UE), wherein the configuration parameter is used for controlling one of antenna management and beam management, wherein when the configuration parameter is used for controlling the antenna management, the configuration parameter includes antenna switching, wherein the antenna switching and the beam management are different states of the configuration parameter, and wherein when the configuration parameter is used for controlling the antenna management, the configuration parameter includes antenna invariability.

2. The parameter configuration method of claim 1, wherein the configuration parameter has at least one of following states:

antenna switching and beam not switching;
antenna switching and beam switching;
beam switching and antenna not switching;
beam switching and antenna switching;
beam invariability and antenna not switching.

3. The parameter configuration method of claim 1, comprising: determining a configurable state range of the configuration parameter or whether the configuration parameter goes into effect according to at least one of following parameters:

a multiplexing manner between sounding reference signal (SRS) resources;
a number of SRS resources comprised in an SRS resource set;
a number of ports comprised in an SRS resource;
a minimum time interval between different SRS resources in the SRS resource set;
wherein the configuration parameter is a configuration parameter of the SRS resource, or a configuration parameter of the SRS resource set.

4. A control method, applied to a user equipment (UE), comprising:

controlling at least one of antenna management or beam management by using a configuration parameter for the UE, which is configured by a base station in a configuration of a sounding reference signal (SRS) resource set, wherein when the configuration parameter is used for controlling the antenna management, the configuration parameter includes antenna switching, wherein the antenna switching and the beam management are different states of the configuration parameter, and wherein when the configuration parameter is used for controlling the antenna management, the configuration parameter includes antenna invariability.

5. The method of claim 4, wherein the configuration parameter has at least one of following states:

antenna switching and beam not switching;
antenna switching and beam switching;
beam switching and antenna not switching;
beam switching and antenna switching;
beam invariability and antenna not switching.

6. The method of claim 4, comprising: determining a configurable state range of the configuration parameter or whether the configuration parameter goes into effect according to at least one of following parameters:

a multiplexing manner between sounding reference signal (SRS) resources;
a number of SRS resources comprised in an SRS resource set;
a number of ports comprised in an SRS resource;
a minimum time interval between different SRS resources in the SRS resource set;
wherein the configuration parameter is a configuration parameter of the SRS resource, or a configuration parameter of the SRS resource set.

7. A base station, comprising a processor, wherein the processor is configured to:

configure a configuration parameter in a configuration of a sounding reference signal (SRS) resource set for a user equipment (UE), wherein the configuration parameter is used for controlling at least one of antenna management or beam management, wherein when the configuration parameter is used for controlling the antenna management, the configuration parameter includes antenna switching, wherein the antenna switching and the beam management are different states of the configuration parameter, and wherein when the configuration parameter is used for controlling the antenna management, the configuration parameter includes antenna invariability.

8. The base station of claim 7, wherein the configuration parameter has at least one of following states:

antenna switching and beam not switching;
antenna switching and beam switching;
beam switching and antenna not switching;
beam switching and antenna switching;
beam invariability and antenna not switching.

9. The base station of claim 7, comprising: determining a configurable state range of the configuration parameter or whether the configuration parameter goes into effect according to at least one of following parameters:

a multiplexing manner between sounding reference signal (SRS) resources;
a number of SRS resources comprised in an SRS resource set;
a number of ports comprised in an SRS resource;
a minimum time interval between different SRS resources in the SRS resource set;
wherein the configuration parameter is a configuration parameter of the SRS resource, or a configuration parameter of the SRS resource set.

10. A user equipment (UE), comprising a processor, wherein the processor is configured to:

control at least one of antenna management or beam management by using a configuration parameter for the UE, which is configured by a base station in a configuration of a sounding reference signal (SRS) resource set, wherein when the configuration parameter is used for controlling the antenna management, the configuration parameter includes antenna switching, wherein the antenna switching and the beam management are different states of the configuration parameter, and wherein when the configuration parameter is used for controlling the antenna management, the configuration parameter includes antenna invariability.

11. The UE of claim 10, wherein the configuration parameter has at least one of following states:

antenna switching and beam not switching;
antenna switching and beam switching;
beam switching and antenna not switching;
beam switching and antenna switching;
beam invariability and antenna not switching.

12. The UE of claim 10, comprising: determining a configurable state range of the configuration parameter or whether the configuration parameter goes into effect according to at least one of following parameters:

a multiplexing manner between sounding reference signal (SRS) resources;
a number of SRS resources comprised in an SRS resource set;
a number of ports comprised in an SRS resource;

a minimum time interval between different SRS resources in the SRS resource set;

wherein the configuration parameter is a configuration parameter of the SRS resource, or a configuration parameter of the SRS resource set.

\* \* \* \* \*